US007254266B2

(12) United States Patent
Cotman et al.

(10) Patent No.: US 7,254,266 B2
(45) Date of Patent: Aug. 7, 2007

(54) METHOD AND APPARATUS FOR GENERATING SPECIAL-PURPOSE IMAGE ANALYSIS ALGORITHMS

(76) Inventors: Carl W. Cotman, 10021 Fox Springs Rd., Santa Ana, CA (US) 92705; Charles F. Chubb, 2 Owen Ct., Irvine, CA (US) 92612; Yoshiyuki Inagaki, 3303 Palo Verde Rd., Irvine, CA (US) 92612; Brian Cummings, 4 Murasaki, Irvine, CA (US) 92612

( * ) Notice: Subject to any disclaimer, the term of this patent is extended or adjusted under 35 U.S.C. 154(b) by 0 days.

(21) Appl. No.: 11/474,064

(22) Filed: Jun. 23, 2006

(65) Prior Publication Data
US 2007/0098252 A1 May 3, 2007

Related U.S. Application Data

(62) Division of application No. 10/134,157, filed on Apr. 25, 2002, now Pat. No. 7,088,854.

(60) Provisional application No. 60/286,897, filed on Apr. 25, 2001.

(51) Int. Cl.
*G06K 9/00* (2006.01)
*G06K 9/62* (2006.01)
(52) U.S. Cl. .................................... 382/156
(58) Field of Classification Search ............... 382/156, 382/159, 162, 164, 165, 173, 181, 224; 358/515, 358/523; 345/589, 593, 653, 654, 664, 665
See application file for complete search history.

(56) References Cited

U.S. PATENT DOCUMENTS

| | | | | |
|---|---|---|---|---|
| 5,642,434 A | * | 6/1997 | Nakao et al. | 382/220 |
| 6,480,627 B1 | * | 11/2002 | Mathias et al. | 382/224 |
| 6,628,823 B1 | * | 9/2003 | Holm | 382/162 |
| 6,718,054 B1 | * | 4/2004 | Lorigo et al. | 382/128 |
| 6,813,373 B1 | * | 11/2004 | Suri et al. | 382/128 |
| 6,993,185 B2 | * | 1/2006 | Guo et al. | 382/176 |
| 7,088,854 B2 | * | 8/2006 | Cotman et al. | 382/165 |
| 2001/0009590 A1 | * | 7/2001 | Holm | 382/162 |
| 2002/0186882 A1 | * | 12/2002 | Cotman et al. | 382/165 |

* cited by examiner

*Primary Examiner*—Amir Alavi
(74) *Attorney, Agent, or Firm*—Dalina Law Group, P.C.

(57) ABSTRACT

Provides quantitative data about a two or more dimensional image. Classifies and counts number of entities an image contains. Each entity comprises a structure, or some other type of identifiable portion having definable characteristics. The entities located within an image may have different shape, color, texture, etc., but still belong to the same classification. Alternatively, entities comprising a similar color/texture may be classified as one type while entities comprising a different color/texture may be classified as another type. May quantify image data according to set of changing criteria and derive one or more classifications for entities in image. I.e., provides a way for a computer to determine what kind of entities (e.g., entities) are in image and counts total number of entities visually identified in image. Information utilized during a training process may be stored and applied across different images.

6 Claims, 15 Drawing Sheets

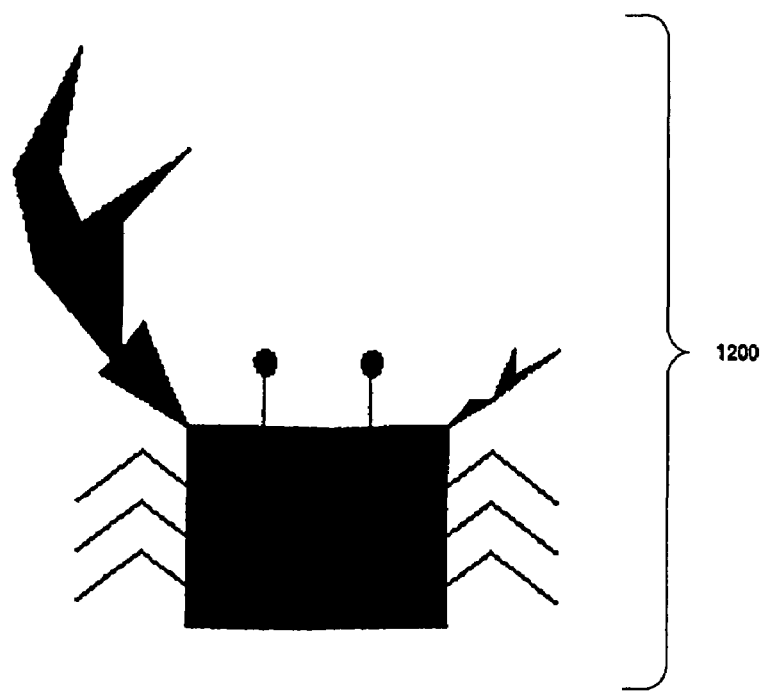
*Figure 12* Original image
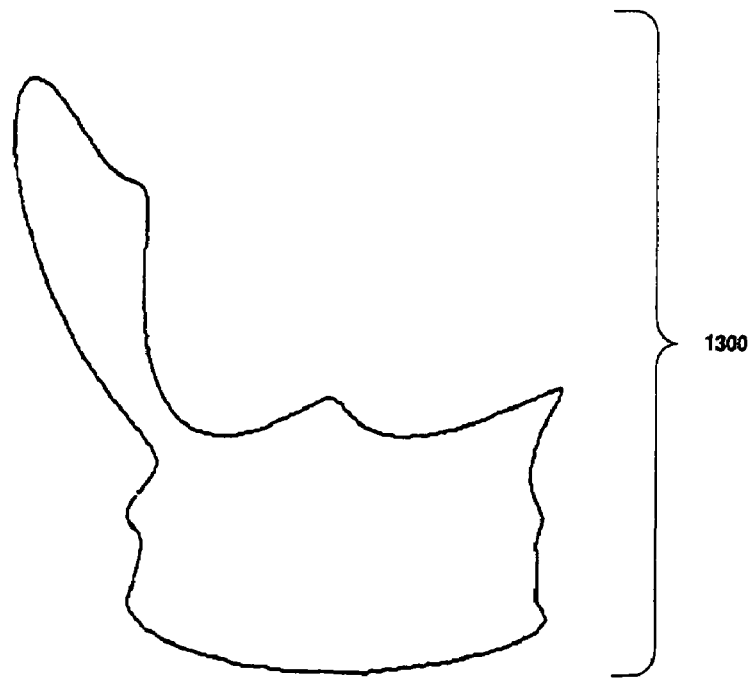
*Figure 13* Reconstructed outline ($k = 10$)

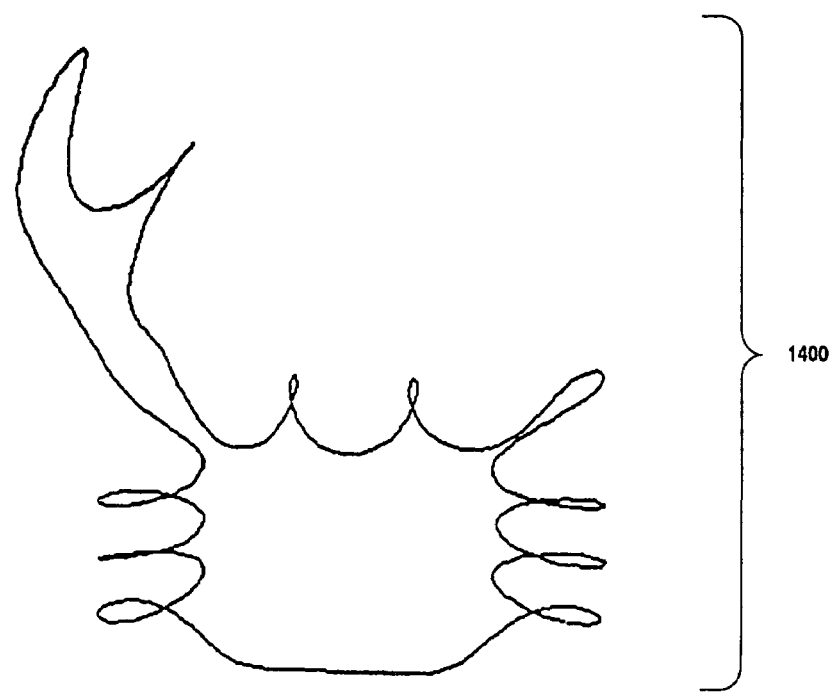
Figure 14 Reconstructed outline (*K* = 20)
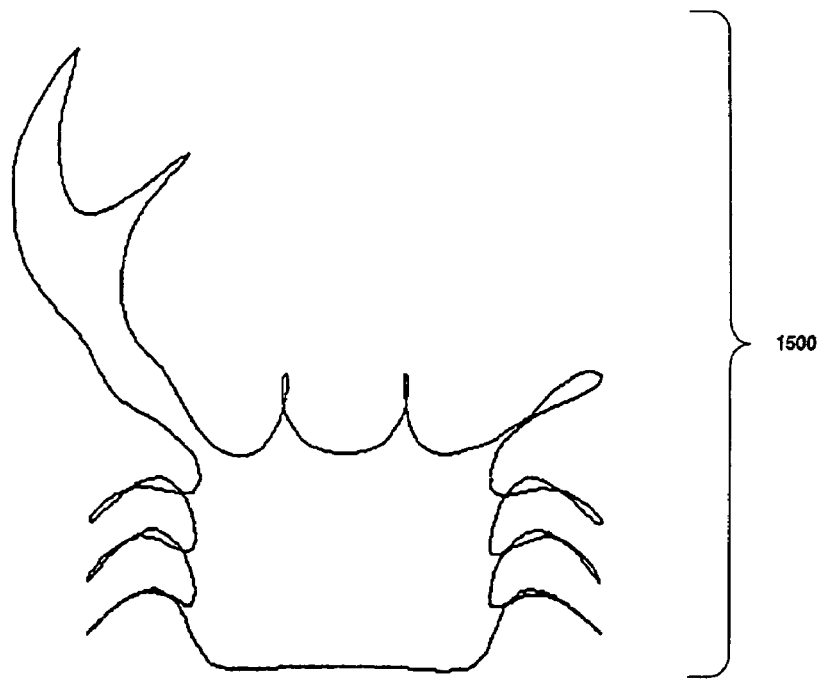
Figure 15 Reconstructed outline (*k* = 30)

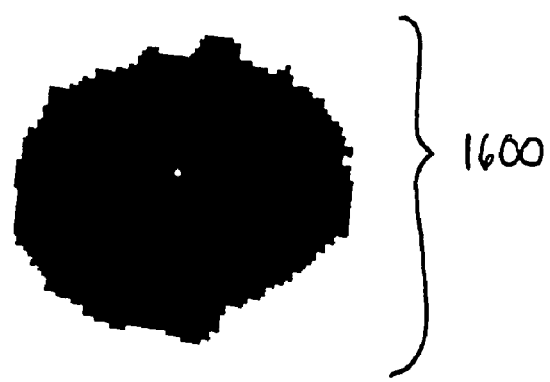
Figure 16 Thresholded image of a single plaque sample
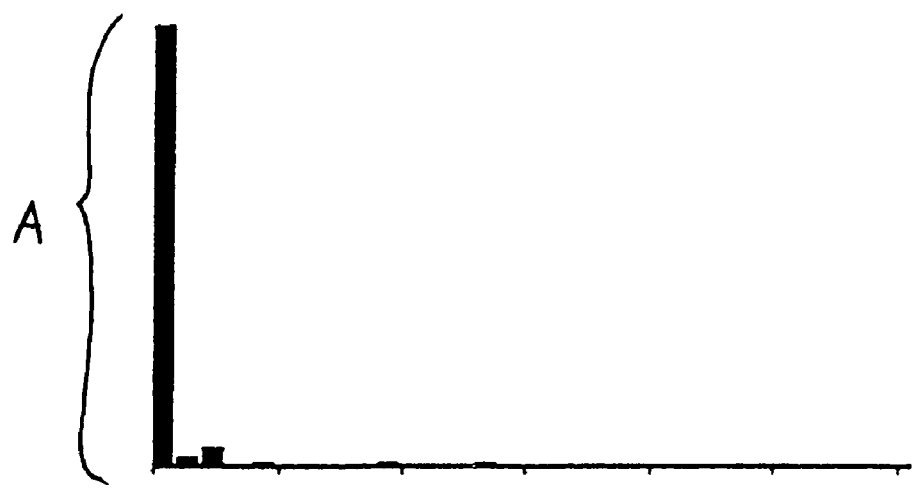
Figure 17 Relative Fourier descriptors of Figure 16

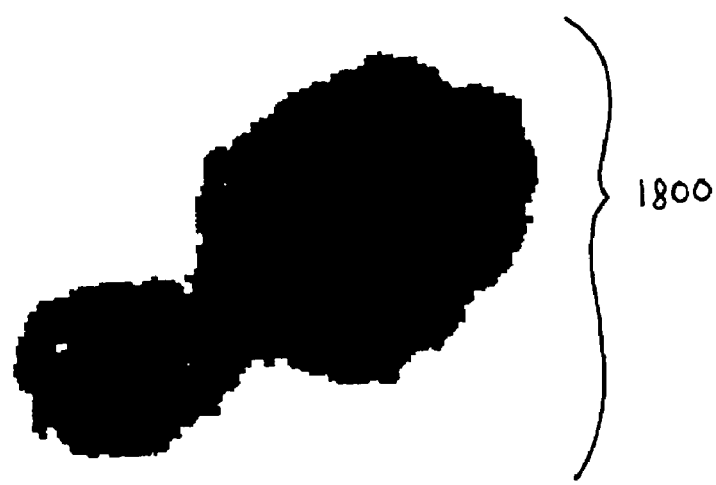
Figure 18 Thresholded image of a double plaque sample
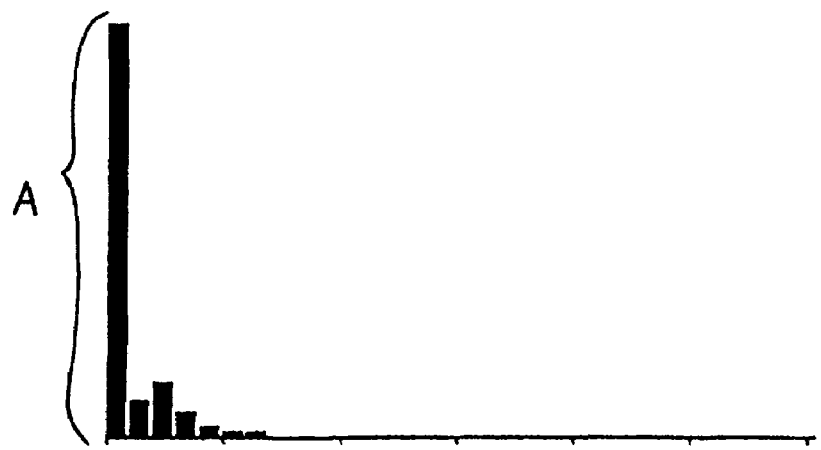
Figure 19 Relative Fourier descriptors of Figure 18

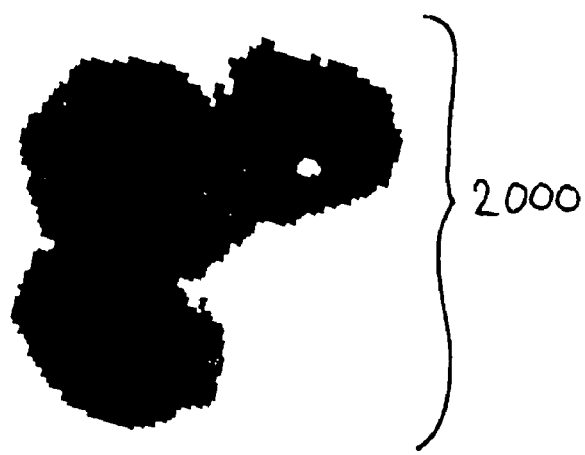
Figure 20 Thresholded image of a triple plaque sample
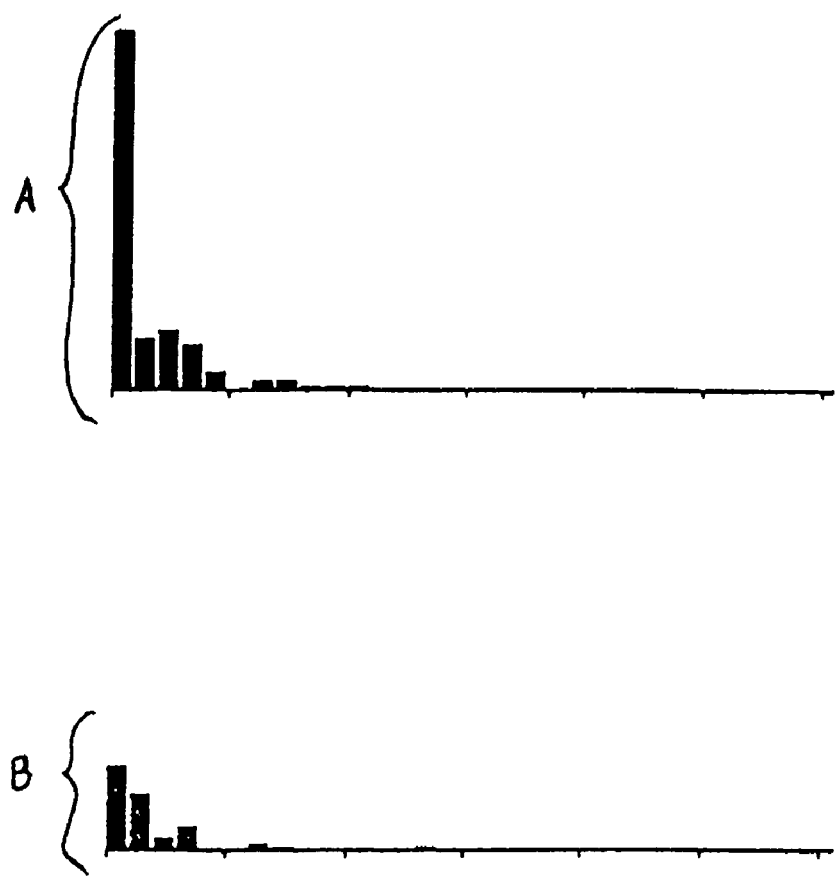
Figure 21 Relative Fourier descriptors of Figure 20

METHOD AND APPARATUS FOR GENERATING SPECIAL-PURPOSE IMAGE ANALYSIS ALGORITHMS

This application is a divisional of U.S. Utility patent application Ser. No. 10/134,157, filed Apr. 25, 2002, entitled "METHOD AND APPARATUS FOR GENERATING SPECIAL-PURPOSE IMAGE ANALYSIS ALGORITHMS" now U.S. Pat. No. 7,088,854 which claims benefit from U.S. Provisional Patent Application Ser. No. 60/286,897, filed Apr. 25, 2001, entitled "METHOD AND APPARATUS FOR PERFORMING THE EXPERT QUANITIFICATION OF IMAGE DATA", the specifications of which are both hereby incorporated herein by reference.

FIELD OF THE INVENTION

This invention relates to the field of computer software or hardware. More specifically, the invention relates to a method and apparatus for generating special-purpose image analysis algorithms based on the expert classification of image data.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

The ability to differentiate between a series of one or more objects comes naturally to human beings. A 5-year old with a set of building blocks can separate the blocks according to size, color, texture, and many other discernible characteristics. Most children can even add more categories to the classification scheme as new qualities appear. For example, as the building blocks age, the surface of the building blocks may fade. If new blocks are introduced to the child, the child can easily tell the difference between the new blocks and the old blocks. Current computer systems, however, find such tasks enormously difficult. Existing systems for classifying objects contained within an image are inherently limited and cannot, for example, effectively identify how many objects of a particular type exist in an image. The limitations of existing technologies become increasingly evident when complex images are to be processed. For example, when the characteristics that distinguish one entity from another are subtle and vary from entity to entity, existing computer systems become unable to accurately classify entities in an image as belonging to a certain type.

There are many uses for an improved system that can reliably quantify entities across multiple sets of image data For instance, scientists, laboratory technicians, doctors, and other professionals have a need for a technology that enables the extraction of quantitative information from an image. Accurately counting the number of entities in an image requires that the person performing the count understand the various forms and nuances associated with the types of entity being counted. A pathologist may be able to look at a particular red blood cell sample and approximate how many red blood cells are in that sample. A research biologist may need to quantify the number of entities present in a histological brain section for purposes of an experiment, but be prevented from doing so by the lack of time or expertise required to manually perform such an analysis. Similarly, a materials scientist may want to count the number of carbon fibers within a cross section of a structural support but be prevented from doing so due to the large number of carbon fibers in the structural support.

Current systems do not have a mechanism for incorporating the expertise of people skilled at identifying a certain entity type. As a result, there is a need for an image classification system that can incorporate such expertise and give others the opportunity to benefit from it. For instance, while a histologist may have the patience to count a few given entities, he or she will usually do so only to a limited degree due to time and cost. Thus the scientific field has been dominated by illustrating findings with a few select captured images resulting in overly qualitative conclusions. When image classification is utilized to support a particular finding, it is typically done so in areas where the fields are not particularly crowded or where the entities of interest in an image are rarely represented. Counting the number of entities in a crowded image has been impractical. Similarly the counting of entities requiring searching over many fields is impractical. There is another key issue however in terms of consistency of entity assignment among viewers, whether they be inexperienced or professional. Entities often have different features and diverse forms despite the fact they belong to the same entity class. In many cases even the professional has their own distinct classification criteria that are not clearly defined, giving rise to inconsistent results across studies. The labor, monotony, and expertise required for the task often precludes investigation into avenues that may have significant merit, but that are exceedingly difficult to perform.

Due to the problems associated with quantifying image data, there is a need for an improved technology that aids the process of obtaining quantitative data from images such as scientific samples. Such a technology has the potential to provide scientists and other users with important insights into the progression of many different diseases as well as the identification of distinguishing features among diseases. Likewise, chemists or materials scientists may discover new processes or improve compounds when aided in the classification and quantification of their unique images.

Some examples of current image quantification techniques and the problems associated with these techniques will now be discussed so as to provide the reader with an understanding of the need for an improved solution. Image Pro Plus, a software package for processing biological images, nicely exemplifies the standard approach to classification. Image Pro Plus™, is an example of a current system that provides a mechanism for counting, measuring, and/or classifying entities in digital images. Image Pro Plus provides the user with several methods for classifying pixels in terms of their colors. Image Pro Plus provides a mechanism for classifying entities in an image based on their morphology, but the system is difficult to use and does not "learn" how to improve its analytical skill over time. To classify the pixels in an image, the Image Pro Plus user must first interact with the application to define different pixel classes. For example, in the "color cube based dialog" Image Pro Plus divides the set of possible pixel colors into a cube, where a color corresponds to a point (r, g, b) in the cube with red, green and blue intensities r, g and b. The user defines as many distinct pixel classes as he/she wishes. For each class, the user uses an eyedropper tool to select the colors he/she wants to include in the class. When all classes have been defined, Image Pro Plus displays an image in which pixels are partitioned into the appropriate pixel classes. If a given color has been included in two different classes, pixels of that color get assigned to whichever class was defined first.

What Image Pro Plus and other current systems lack is the ability to embody the knowledge of the trained histologist within a general tool that can be used to automate the classification of pixels and/or entities across a broad range of images. The importance of such a general tool lies in its potential to standardize the classification of histological structures across an entire biomedical field or subfield (e.g., the subfield focusing on Alzheimer's Disease). In addition, these same issues also hinder classification of image data in other scientific disciplines as well (e.g. materials science, chemistry, etc. . . . ).

Thus, there is a need for a system that improves upon the existing methodologies and systems for classifying image data Such an improved system will now be described in detail.

SUMMARY OF THE INVENTION

An embodiment of the present invention comprises a method and apparatus for generating special-purpose image analysis algorithms based on the expert classification of image data. One embodiment of the invention provides a process and related apparatus for obtaining quantitative data about a 2-dimensional, 3-dimensional image, or other dimensional image. For example, the invention is capable of classifying and counting the various different types of entities an image contains. Each entity comprises an object, structure, or some other type of identifiable portion of the image having definable characteristics (e.g., texture, shape, color, etc. . . . ). The entities located within an image may have a different shape, color, texture, or other definable characteristic, but still belong to the same classification. In other instances, entities comprising a similar color, and texture may be classified as one type while entities comprising a different color, and texture may be classified as another type. An image may contain multiple entities, and each entity may belong to a different class. Thus, the system embodying the invention may quantify image data according to a set of changing criteria and derive one or more classifications for the entities in the image. Once the image data is classified, the total number of each class of entity in the image may be calculated and presented to the user. Put simply, the invention provides a way for a computer to determine what kinds of entities are in an image and optionally count the total number of each class of entities that can be visually identified in the image. In one embodiment of the invention, the system is trained to perform such analysis by a user skilled at the identification of a particular object and/or entity. Once the system has been trained to master the classification process, the expertise gained during that training can be saved for subsequent usage by the same or a different user.

Some examples of the type of entity embodiments the invention may be configured to recognize include biological entities contained within histological sections, or physical entities in a material sample. Such biological entities may comprise any type of generalized cellular or non-cellular structure and the invention provides a mechanism for identifying and classifying different types of biological entities in a tissue section. For instance, the invention can evaluate stained tissue sections prepared by immunocytochemical and related techniques and determine what types of entities are contained in the tissue section and how many of those entities are present. Thus, a neuropathologist may utilize embodiments of the invention to classify and count the number of histological entities present in a digitized representation of a biological tissue section. However, the reader should note that the invention that will now be discussed herein is not limited to the realm of biological images alone. The system provides a mechanism for identifying any type of entity across any set of image data.

Obtaining quantitative data from histological sections in the study of dementias such as Alzheimer's Disease is crucial in understanding disease progression. However, due to the tedium of the manual counting task, systematic, large-scale counts are rarely obtained. If a tissue sample taken from a patient having Alzheimer's disease is evaluated, the system can identify tangles stained with reagents directed against tau as well as plaques stained for Beta-Amyloid. Once these entities are identified, the system may count the number of tangles and plaques that are present in the image. Presently, the pathological diagnosis of Alzheimer's disease is based primarily on the presence or absence of plaques and tangles, but not on their absolute numbers because of the difficulties inherent in the quantification of these lesions and because of time constraints. A reproducible method of quantifying plaques and tangles across labs would allow more stringent classification standards. The problem of identifying cells in histological preparations has a long history in computer image processing. However, most researches have been focused on distinguishing cells from non-cells. Thus, there is a specific need in addition to the generalized need described above to have a program that can perform image processing in a way that can aid Alzheimer's research and/or any other scientific investigation that can utilize images.

DESCRIPTION OF THE DRAWINGS

FIG. 12 illustrates an original image to be processed in accordance with one embodiment of the invention.

FIG. 13 illustrates a reconstructed outline of the original image in accordance with one embodiment of the invention.

FIG. 14 illustrates a reconstructed outline of the original image in accordance with one embodiment of the invention.

FIG. 15 illustrates a reconstructed outline of the original image in accordance with one embodiment of the invention.

FIG. 16 illustrates a threshold image of a single entity example in accordance with one embodiment of the invention.

FIG. 17 illustrates the relative Fourier descriptors of the example single entity (e.g., plaques).

FIG. 18 illustrates a threshold image a double entity (e.g., biological entity such as plaques) in accordance with one embodiment of the invention.

FIG. 19 illustrates the relative Fourier descriptors of the example double entity in accordance with one embodiment of the invention.

FIG. 20 illustrates a threshold image a triple entity (e.g., biological entity such as plaques) in accordance with one embodiment of the invention.

FIG. 21 illustrates the relative Fourier descriptors of the example triple entity in accordance with one embodiment of the invention.

DETAILED DESCRIPTION

Figure 1:
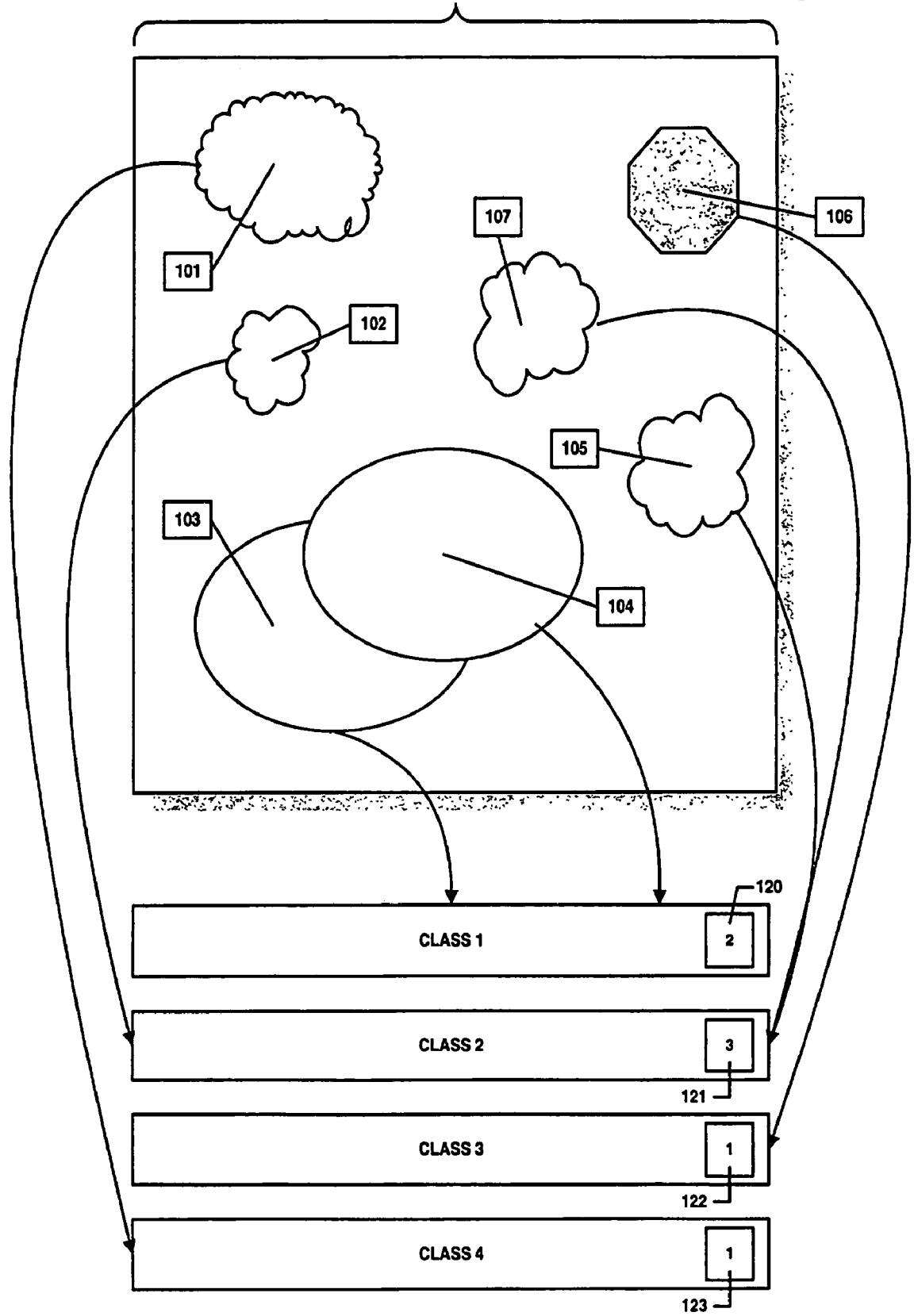
FIG. 1 is a block diagram that illustrates the classification of a plurality of different entities with an image.

A method and apparatus for generating special-purpose image analysis algorithms based on the expert quantification of image data is described. In the following description numerous specific details are set forth in order to provide a more thorough understanding of the present invention. It will be apparent, however, to one skilled in the art, that embodiments of the present invention may be practiced without these specific details. In other instances, well-known features have not been described in detail so as not to obscure the invention.

The invention may be implemented in a hardware device and/or software form and may, for example, comprise computer readable program code tangibly embodied in a computer readable medium such as a processor, or memory coupled to the processor. In other instances, the invention executes in memory such as a hard disk, floppy disk, and/or or any other form of memory capable of storing computer readable program code. An embodiment of the invention contemplates the use of multiple computers to process image data and the invention may store or capture data image data in multiple locations accessible via a network.

System Overview:

One embodiment of the invention provides a process and related apparatus for obtaining quantitative data about a 2-dimensional, 3-dimensional image, or other dimensional image. For example, the invention can be used to produce a product algorithm capable of classifying and counting the numbers of different types of entities an image contains in accordance with the judgment of the user. Each entity may comprise an object, structure, or some other type of identifiable portion of the image having definable characteristics (e.g., a texture, shape, size, color, density, etc. . . . ). The entities located within an image may have a different shape, color, texture, or other definable characteristic, but still belong to the same classification. In other instances, entities comprising a similar color, and texture may be classified as one type while entities comprising a different color, and texture may be classified as another type. An image may contain multiple entities, and each entity may belong to a different class. The system embodying the invention may be used to produce many different product algorithms, which may be used to classify image data according to different criteria. Once the image data is classified using a particular product algorithm generated using an embodiment of the invention, the total number of entities in the image may be calculated and presented to the user. Put simply, the invention provides a way for a user to generate a product algorithm that can be used to determine what kinds of entities are in an image and count the total number of entities that can be visually identified in the image.

In one embodiment of the invention the system utilizes of a set of evolving algorithms (e.g., Bayes' Theorem, a neural network, or any other image classification algorithm) to evaluate image data. The system may utilize any one of the evolving algorithms to evaluate different features of the image and may execute multiple iterations of each algorithm. For instance, the user interacts with the system to generate a product algorithm comprising two processing stages. A first stage of processing, for example, may classify image data based on color and/or texture, and a second stage of processing may then evaluate parts of the image based on shape. The use of the invention to evolve a product algorithm may require one or more iterations in which the system uses input from the user to refine its model of (i) the different classes of material composing entities in the image, and (ii) the different classes of entities occurring in the image. User input during the evaluation can modify the evolving product algorithm. For example, user input may be used by the system to change the parameters defining a certain class of entities thereby enabling the mechanism to evolve. Once an acceptable scheme has evolved (e.g., the probabilities and/or neural network analysis consistently classifies different entities correctly), the evolving algorithm may be locked in place to yield a first product algorithm. Then a daughter algorithm allowed to further evolve. Once an evolving algorithm is locked in place it may be referred to as a product algorithm that can be stored for subsequent usage by the same or a different user and applied to additional image sets for purposes of analysis.

Some examples of the type of entities product algorithms configured in accordance with embodiments of the invention may be trained to recognize include biological entities contained within histological sections. Such biological entities may include any type of generalized cellular or noncellular structure, and the invention provides a mechanism for producing product algorithms capable of identifying and classifying different types of biological entities in a tissue section according to various different criteria. For instance, the invention can be used to generate one or more product algorithms to evaluate stained tissue sections prepared by immunocytochemical and related techniques and determine what types of entities are contained in the tissue section and how many of those entities are present. Thus, a neuropathologist may utilize embodiments of the invention to generate product algorithms to classify and count the number of histological entities present in any digitized representation of a biological tissue section. For instance, if a tissue sample taken from a patient having Alzheimer's disease is evaluated, the system can be used to generate a product algorithm to identify tangles stained with reagents against tau as well as plaques stained for Beta-Amyloid. Once these entities are identified, the system may count the number of tangles and plaques that are present in the image.

It is important to note that the illustrations provided here are for exemplary purposes and the process utilized to quantify image data also has applications in arenas other than the identification of biological entities. The invention is not limited solely to the quantification of histological samples and is intended to have applications for analyzing other types of images. Thus, users may also utilize the process described herein to generate product algorithms to evaluate any type of digitized image and classify any of the entities in that image that have definable characteristics. These characteristics may change over time as the system and the user learns more about the structures being analyzed.

Example Image Classification:

FIG. 1 is a block diagram that illustrates the classification of a plurality of different entities with an image. Referring now to FIG. 1 for example, a representation of an image 100 comprising a group of entities 101-107 is shown. Embodiments of the invention provide a mechanism for producing a product algorithm to classify and identify the entities contained within the image. The mechanism embodying aspects of the invention may take the form of computer software, and the process or methodology captured for performing such classification can be utilized by multiple instances of such computer software. Each entity 101-107 represents a portion of a digitized image that has one or more definable characteristics. Entity 101 may represent a cellular or non-cellular entity, a tangible object, a person, thing, or a representation of a tangible object (e.g., a radar image of a particular airplane), person, or thing. Entity 101, has at least one characteristic and may, for example, be associated with the characteristics A, B, and C. Entity 102 may be associated with the characteristics D, E, and F. Entity 103 may be associated with the characteristics G, H, and I. Entity 104 may have a set of characteristics similar to entity 103. Entities 105 and 107 are associated with characteristics similar to those associated with entity 102. Entity 106 is associated with characteristics J, K, and L. In one embodiment of the invention, structures that have similar characteristics are placed into the same class. Thus, entities 103 and 104 may belong to class 1 and entities 102, 107, and 105, for example, may be assigned to class 2. Since entities 101 and 106 each have different characteristics, they are each assigned to their own class. Once the entities in an image are classified, the process utilized to make such a determination may be stored in the form of a product algorithm (e.g., an instance of the evolving algorithm) and the system may use that algorithm to count the number of entities in each class.

Overlapping entities (e.g., 103 and 104) are counted in accordance with one embodiment of the invention as separate structures. Class 1, for example, has a count 120 of two entities and class 2 has a count 121 of three entities. The remaining classes each have one entity. Thus, class 3 has a count 122 of one entity and class 4 has a count 123 of one entity. Once the entities are classified by an embodiment of the invention, a total count of the number of each type of entity can be performed. The process for making such entity classifications will now be discussed in more detail.

Figure 2:
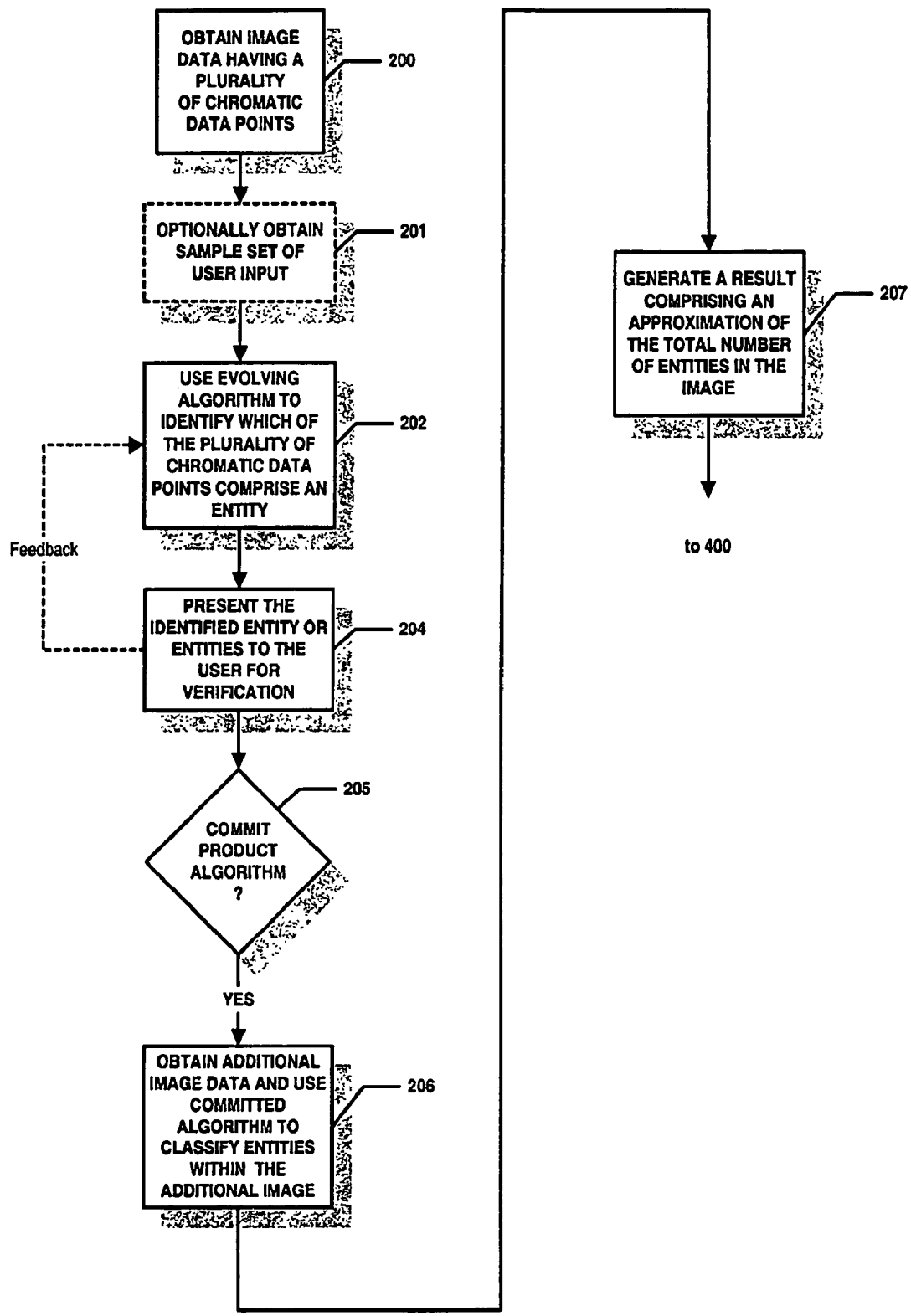
FIG. 2 illustrates a high-level view of the process used to evaluate image data to generate an algorithm based on feedback from a user that is capable of deriving quantitative information about entities within the image.

High-Level Process Flow:

FIG. 2 illustrates a high-level view of the process used to evaluate image data to generate an algorithm based on feedback from a user that is capable of deriving quantitative information about entities within the image. The process initiates when the system embodying the invention obtains an image having a number of chromatic data points (e.g., step 200). For instance, the system may capture a picture using a mechanism such as a digital camera, video camera, or scanning device. The invention contemplates the use of many different types of image acquisition devices and can be adapted to interface with any device capable of obtaining a digital image or representation of an image. Most conventional video capture cards that provide a resolution of 640×480 or greater provide a sufficient basis for analysis. However, the system may be adapted to utilize image data of any resolution. True-color (24-bit) is used in one embodiment of the invention, since this provides a significant range of colors to evaluate. The invention is not limited, however, to the use of true-color and can process many different types of image data (e.g., black and white, grayscale, or color of arbitrary spectral dimension and of any bit depth).

Once the image acquisition device captures the image data, the captured image data is provided to the system where it is stored in memory or otherwise held for subsequent processing. Any computer readable medium capable of storing digital or analog data may be adapted to hold the captured image data. In one embodiment of the invention each chromatic data point represents a pixel or some other subset of the image data having an associated color value (e.g., RGB, CMYK, PMS, Pantone™, or any other definable color space). Each pixel may be a single dot or a series of interconnected dots (e.g., NTSC, PAL, etc.). The image may have millions of different chromatic data points. However, one or more of the chromatic data points may have an identical or similar range of values. For instance, the image may have two pixels that contain the same or similar RGB values. Each image contains one or more entities comprised of a plurality of chromatic data points. The entities are visual representations of structures, objects, or other portions of the image having definable characteristic that may be identified via the process of image quantification described herein.

Once the image is acquired the system begins to evaluate the image data to determine what portions of the image can be classified as certain entities. The initial evaluation may or may not involve user input (e.g., step 201). However, if user input is provided the system utilizes such input to aid the process of entity identification. In one embodiment of the invention, the system provides an initial guess as to which of the plurality of chromatic data points comprise an entity (e.g., step 202). There are multiple mechanisms by which the identification process of step 202 may occur. For example, the system may analyze the image to determine the number of pixels that fall within a color range (e.g., tolerance level). The tolerance or threshold that is utilized can be determined by the user or by the system. Embodiments of the invention allow the user to select an area of the image that contains an entity to be counted or classified. The selected area can be referred to as a sample set of chromatic data points. The user may, for example, select a single chromatic data point or a set of chromatic data points that comprises the entity or set of entities targeted for classification. The system then analyzes the sample set of chromatic data points identified by the user and uses the results of the analysis as a basis for identifying which parts of the image may contain an entity.

In other instances the user may identify which portions of the image are background. The system then uses that identification to approximate which chromatic data points are background and which may be entities. The system may also be configured to guess which parts of the image are background and which parts of the image are not by using data gathered during analysis of other images identified as containing similar entities.

Figure 3:
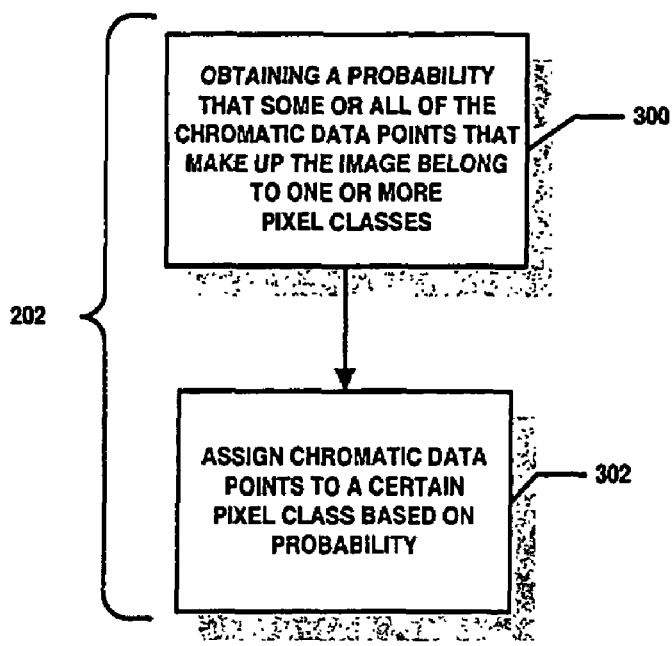
FIG. 3 illustrates a high-level view of the additional process step utilized during evaluation of image data in accordance with one embodiment of the invention.

If the system was previously utilized to evaluate similar images, the system may be configured to utilize the information gathered during the previous analysis and utilize that information for initially approximating which portions of the image contain entities. In accordance with one embodiment of the invention identifying which of said plurality of chromatic data points comprises an entity (e.g., step 202) may also entail obtaining a probability that some or all of the chromatic data points that make up the image belong to one or more pixel classes (see e.g., FIG. 3 step 300). For instance, the system may determine which parts of the image falls within a certain range or distribution of color values collectively referred to as a pixel class. Each image contains multiple pixel classes and the pixel classes may contain overlapping values. A first pixel class defined as comprising the color values 0,0,0 through 155, 23, 34 may overlap with a second pixel class when the second pixel class contains values that fall within the range defined by the first pixel class. The user may define the composition of the pixel class by selecting one or more chromatic data points from the image. Alternatively, in one embodiment of the invention, pixel classes are defined by density functions that assign non-zero values to all chromaticities. Thus, each pixel class may include all possible chromaticities. However, a given pixel-measure vector may have higher probabilities in some pixel classes than in others.

The probability may be based in whole or in part on the identification made by the user and/or a previous analysis of an image identified as a certain type (e.g., a tissue section likely to contain cancer cells stained in a certain manner). Such probabilities may be referred to as prior probabilities, but can also contain additional measures for evaluating the image. Once various portions of the image are associated with one or more pixel classes (e.g., based on the RGB value of the sampled chromatic data point), the chromatic data points may be assigned to a certain pixel class based on the probability the data point belongs to that class (e.g., step 302). This initial approximation may be performed with or without user input. However, in one embodiment of the invention a user provides the system with information that can be used to help derive prior probabilities. The user may, for example, provide information based on the user's own experience that aids the system in determining the probability a pixel will belong to a certain class. As mentioned above, user input is not required and the system may assume at the outset that all classes (including background) are equally probable. Then after a few images have been classified (and ratified by the user e.g., at step 204), the system is able to obtain an understanding about a cross-section of the image population that may be used to estimate prior probabilities more accurately. The understanding is incorporated into the analysis performed by the system using the evolving algorithm and can be saved for later usage as a product algorithm. The system's ability to classify entities improves over time as the number of classified images held in an entity zoo increases (see e.g., FIG. 9; elements 920-936). The entity zoo is discussed in further detail below.

Embodiments of the invention may be configured to perform varying iterations of analysis (e.g., using the same or various other methodologies or algorithms for evaluating the image data). The various types of analysis may be performed at the entity identification phase of the process and each iteration of analysis is designed to further refine the evolving algorithm's ability to classify image data.

Figure 4:
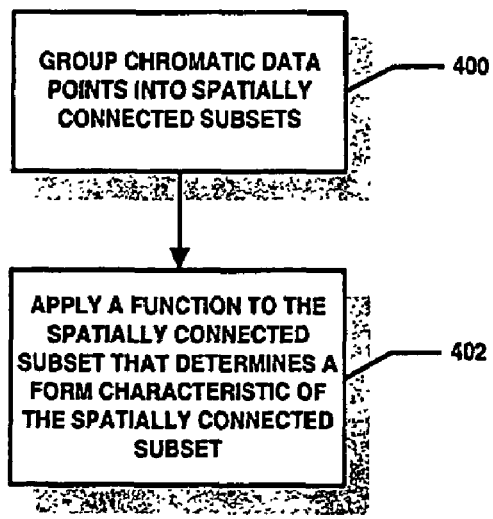
FIG. 4 illustrates a high-level view of the additional process step utilized during evaluation of image data in accordance with one embodiment of the invention.

In one embodiment of the invention, the system initiates an iteration of analysis where it groups the chromatic data points into maximal spatially connected subsets whose points are in the same pixel class (see e.g., FIG. 4 step 400). In one embodiment of the invention, such maximal spatially connected subsets of chromatic data points may also be referred to as blobs, and the grouping of chromatic data points into blobs is referred to as blob partitioning. In this embodiment of the invention, entities are required to be blobs of different types. However, the invention contemplates relaxing these restrictions in several ways. First, blobs may be allowed to comprise not only maximal spatially connected subsets of pixels from the same class, but maximal subsets of pixels from the same pixel class such that every pixel in the blob is within a specified distance of some other pixel in the blob. Second, the invention contemplates allowing entities to consist of collections of several blobs from one or more pixel classes (rather than requiring every entity to consist of a single blob). The grouping of chromatic data points may involve obtaining a probability that the spatially connected subset is associated with a particular entity, and groupings may then be utilized to aid the system in assigning each of the chromatic data points to an entity.

In the use of the invention to evolve a product algorithm, the results of the initial approximation or a subsequent approximation can be presented to the user for verification (See e.g., step 204 of FIG. 2) via any type of user interface. In one embodiment of the invention a verification message is displayed to the user for purpose of obtaining input from the user that reflects the user's judgment about the accuracy of a classification. The verification message is transmitted to the user via any viable data path and may be sent to users in remote locations via an interconnection fabric such as a computer network. Upon receipt of the verification message, the user makes a judgment about the correctness of the classification. For instance, the user may acknowledge the correctness of the identification or indicate that a portion of the image the system identified as a certain type of entity is an entity of a different type. The data collected from the user during this process is stored and utilized in accordance with one embodiment of the invention for subsequent analysis of the image. Over time the system learns from obtaining feedback from the user and thus the ability of the system to properly identify, classify, and count the number of entities in the image improves.

For instance, at step 204, the system may present the initial identification to the user for feedback as to the classifications made and use that feedback as input to another iteration of the entity identification step 202 illustrated in FIG. 2. The system may execute multiple iterations of this loop until the user indicates a desire to lock the evolving algorithm used to identify the entities in place and thereby commit an instance of the algorithm to memory (see e.g., step 205). When an evolving algorithm is locked that algorithm can now be referred to as a product algorithm (or an instance of an evolving algorithm) and can be applied to different images or set of images by different users than the user responsible for training the algorithm (see e.g., step 206). However, the reader should note that the product algorithm essentially a saved instance of the evolving algorithm and that like the evolving algorithm it may also be permitted to evolve. In some instances, such evolution may not be desirable. This is particularly the case when an expert at a particular type of image classification was involved in training the product algorithm and the ultimate user of the product algorithm is a novice at identifying such classifications.

The system may store any of the data collected during the image analysis and use that data to aid subsequent analysis. Image data, user data, verification data, probability data, and any other information collected during evaluation of the image can be stored in a data repository and later utilized. Previous results obtained from the data repository can be used to determine probabilities. Such stored data is referred to in one embodiment as the product algorithm, although generally speaking the evolving algorithm may also utilize the stored data in any manner deemed helpful to the image analysis. Both the evolving algorithm and the product algorithm are capable of using the learned ability to classify a particular type of entity to generate a result that comprises an approximation of the total number of entities in the image (e.g., step 207).

Figure 5:
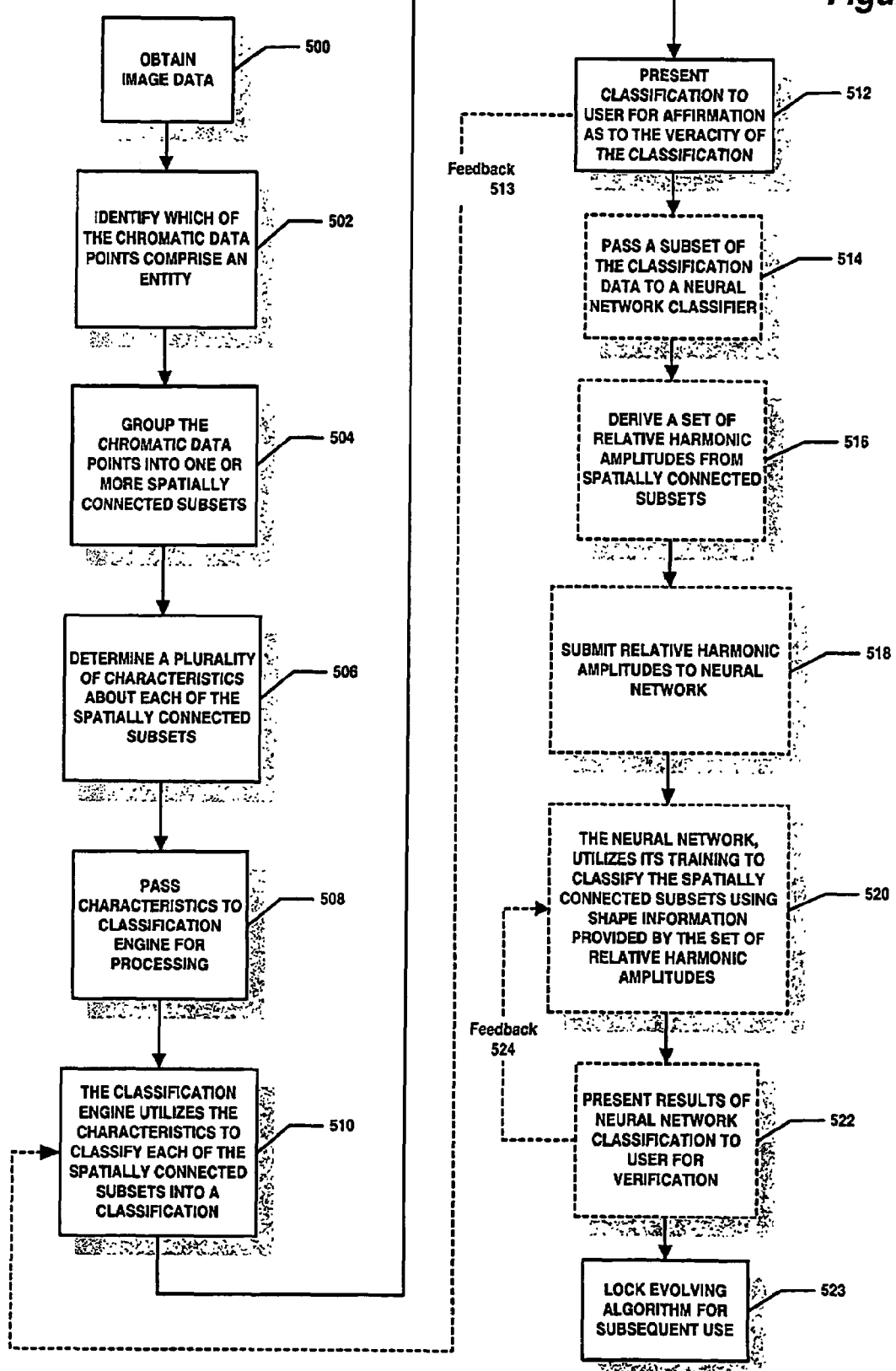
FIG. 5 illustrates a high-level view of the methodology for processing image data using a neural network engine in accordance with one embodiment of the invention.

Neural Network Overview:

Embodiments of the invention may be configured to additionally process the acquired image data using a neural network engine. FIG. 5 illustrates a high-level view of the methodology for processing image data using a neural network engine in accordance with one embodiment of the invention. The neural network engine comprises a neural network and may optionally contain preprocessing functionality capable of preparing data for processing by the neural network engine. The preprocessing functionality may be contained within the neural network engine or part of another module that interfaces with the neural network engine.

For example, the system may obtain an image having many different chromatic data points (e.g., step 500), identify which of the chromatic data points comprise an entity (e.g., step 502 which may occurs via user input or automatically by the system via a classification algorithm), group the chromatic data points into one or more spatially connected subsets (e.g., step 504 which may group portions of the image together that fall with a certain color distribution), and determine a plurality of characteristics about each of the spatially connected subsets (e.g., step 506). These characteristics may then be passed to a classification engine for processing (e.g., step 508). The classification engine utilizes the characteristics of the spatially connected subsets to classify each of the spatially connected subsets into a classification (e.g., step 510). Some spatially connected subsets are assigned to a first class identifying the entity as a certain type and other spatially connected subsets may be assigned to a second class. In one embodiment of the invention the classification engine utilizes Bayes' Theorem as the basis for determining the appropriate classifications. Subsequent (or previous) evaluations of the image data may occur using Fourier Shape Descriptors and/or a neural network. The determination made by the classification engine is then presented to the user for affirmation as to the veracity of the classification (e.g., step 512). Feedback (513) obtained from the user at this point can be used as input to one or more subsequent iterations of the classification engine. Optionally, the system may elect to pass a subset of the classification data to a neural network classifier engine (e.g., step 514).

The neural network classifier comprises a system of program and data structures designed to approximate the operation of the human brain. The neural network classifier may contain a large number of processors operating in parallel where each processor has a sphere of knowledge it understands. The classification data and/or other input are utilized to train the neural network and thereby increase the network's sphere of knowledge. The subset of data passed to the neural network in one embodiment of the invention is derived according to criteria defined by a user or users. The spatially connected subset is then evaluated to derive a set of relative harmonic amplitudes (e.g., step 516). The relative harmonic amplitudes may also be performed independently of the neural network engine. A fast Fourier transform calculation may be used to derive each relative harmonic amplitude. When a spatially connected subset is passed to a neural network classifier engine, the perimeter of the spatially connected subset is traversed counterclockwise and an N-point boundary of it is extracted. Then, a discrete Fourier transform algorithm is applied to the N-point boundary to calculate pairs of harmonic amplitudes, $|z_{-n}|$ and $|z_n|$ for n=1, 2, ... ,N. typically focuses only on $|z_{31\ n}|$ and $|z_n|$ for n=1, 2, ... , 10. Each of these 20 harmonic amplitudes is divided by the largest amplitude of these 20 amplitudes to yield a relative harmonic amplitude.

$$|z'_n| = \frac{|z_n|}{M}, \text{ where } M = \max\{|z_k| \mid k = \pm 1, \pm 2, \ldots, \pm 10\}.$$

Specifically, in one embodiment of the invention, the relative amplitudes of the low-order 20 Fourier shape descriptors of the boundary of the spatially connected subset are computed. These 20 values may be referred to as harmonic amplitudes. These 20 harmonic amplitudes are submitted as input to the neural network, which uses them to classify the connected subset as a specific type of entity. The reader should note, however, that more or less than 20 harmonic amplitudes may be utilized and that the ultimate number utilized depends upon the size and complexity of the image begin analyzed. Some embodiments of the invention may utilize other shape descriptors to define boundaries. Thus, the invention is not limited to the use of low-order Fourier shape descriptors, but can use any shape descriptor capable of defining boundaries.

Submit relative harmonic amplitudes to the neural network (e.g., at step 518). More specifically, for example, each blob (e.g., spatially connected subset) generates a corresponding vector of 20 relative harmonic amplitudes. These 20 relative harmonic amplitudes can be provided to the neural network as input at step 518. The neural network, configured in accordance with one embodiment of the invention is trained to classify the spatially connected subsets using shape information provided by the set of relative harmonic amplitudes (e.g., step 520). The results of the classification performed by the neural network can then be optionally presented to the user for verification (e.g., step 522). The neural network may then utilize the user feedback (524) to adjust its analysis in accordance with the input obtained from the user. Thus, the input can be utilized as training criteria and used to improve performance of the image analysis over time. Once the entity classification engine and/or the neural network engine are deemed by the user to be appropriately trained, the user may elect to lock the algorithms generated by classifying a particular type of entity into place for subsequent use on the same or another set of images (see e.g., step 523).

The neural network in one embodiment of the invention comprises one input layer, two hidden layers and one output layer. The input layer may comprise, for example, 20 input neurons and one bias input neuron (although there may be more or less input neuron or bias input neurons). Each hidden layer comprises 16 hidden neurons, and the output layer comprises 5 output neurons (although there may be more or less hidden neurons or output neurons). This is a fully connected feed-forward network with three layers of adaptive weights. Networks having three layers of weights can generate arbitrary decision regions, which may be non-convex and disjoint.

The neural network accepts a number of relative harmonic amplitudes associated with a spatially connected subset (e.g., 20 although the number may differ depending upon the size of the image). Each output neuron corresponds to a specific class of entity. The outputs of all output neurons are compared, and then, the index of the output neuron that gives the largest value is returned as the class of the spatially connected subset whose relative harmonic amplitudes were presented to the input layer.

Although the neural network is pre-trained, the user can train the network through back-propagation as the user indicates a correct classification to the network. The user also can save the trained network for later use.

Figure 11:
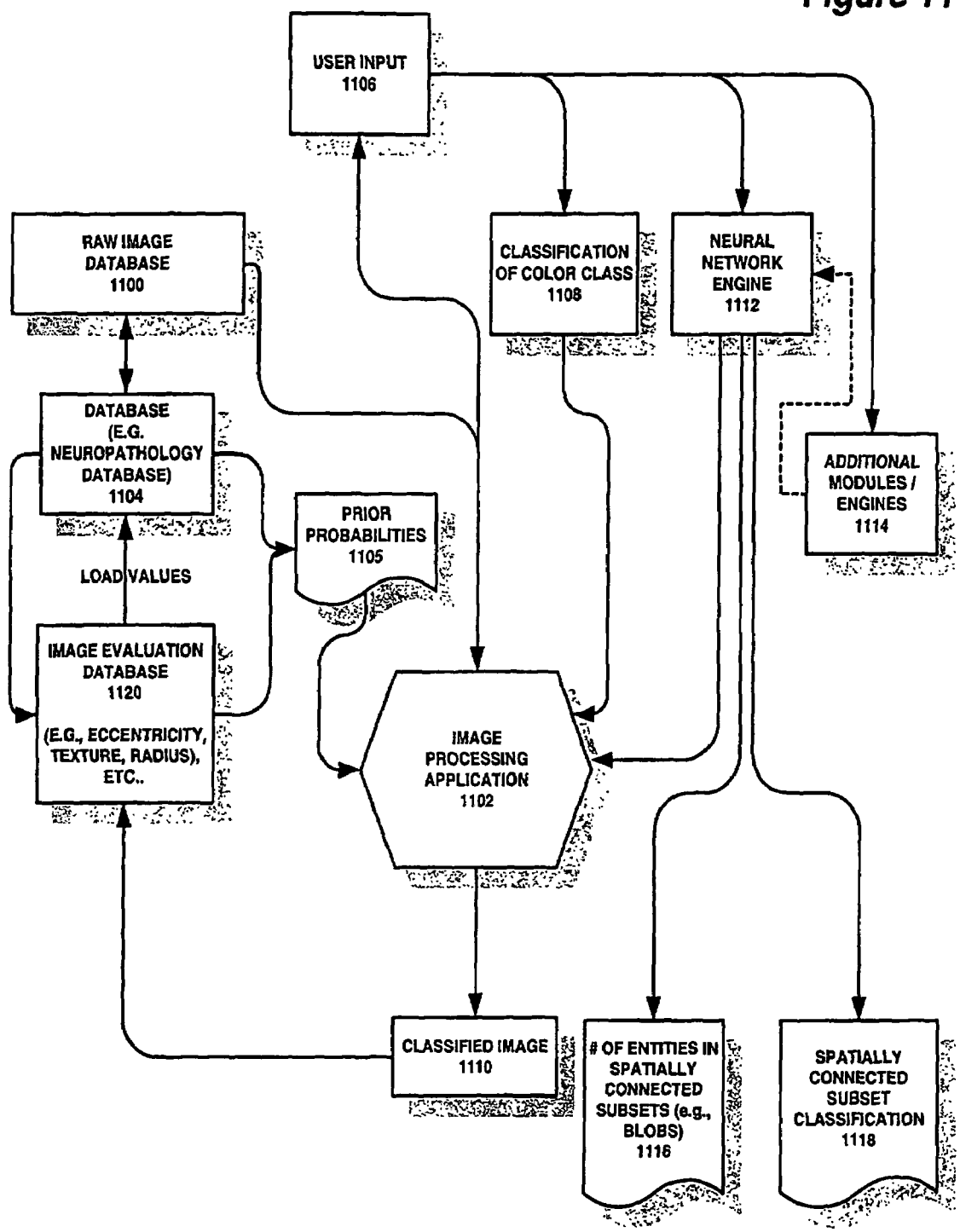
FIG. 11 illustrates the components incorporated within the system in accordance with one embodiment of the invention.

System Components:

FIG. 11 illustrates the components incorporated within the system and input provided to the system in accordance with one embodiment of the invention. User input 1106 may be provided to a classification engine 1108, neural network engine 1112 or to other engines or modules 1114 configured to enhance or add functionality to the system. Classification engine 1108 may be involve manual input from the user (e.g., a sample set) or automatically obtain input from the image. In one embodiment of the invention, Classification engine 1108 classifies based on color or some other measure such as texture and provides such data to image processing application 1102 which utilizes at least one of the image processing methodologies described herein to generate classified image 1110. For instance, the image processing application may utilize multiple iterations of Bayesian processing and/or may also use multiple iterations of processing performed by the neural network engine 1112. Such processing enables image-processing application 1102 to continually evolve and improve over time as the number of images (or amount of information) it reviews increases. After performing the methodology described herein, neural network engine 1112 may perform some level of classification (e.g., 1118) on identified spatially connected subsets and can therefore output the number of entities (e.g., objects) in spatially connected subsets (e.g., blobs) (e.g., 1116). This data may be utilized by the image processing application in some instances. Attributes (e.g., color, texture, radius, size, proximity to other entities, or any other useful descriptive feature, etc. . . . ) of classified image data 1110 are typically stored in image evaluation database 1120. The information stored in the image evaluation database 1120 can be referred to as the product algorithm. The attributes or stored values are loaded into a database 1104 (e.g., a neuropathology database) and the information may be utilized to derive prior probabilities 1105 that can be used by the image processing application for subsequent analysis of the same or different images. Such aggregate image data can be made available to other scientists to verify patient diagnosis, aid in the selection of samples for further research purposes etc. . . . In addition entities may be compared with other non-visual data (e.g., genetic information, demographics, sex, disease presence, disease subtype, severity of the disease, subtypes of individuals including race, disease severity, prior medical history, genetic profiles). Entities can also be compared to data sets derived from similar sources containing genetic profiles of individuals (e.g., gene fingerprints). For example, the fine features of neuropathology can be effected by gene mutations, age itself, sex, etc. . . . and thus could constitute a distinct feature of an evolving algorithm.

The image data itself is typically held in raw image database 1100, although image data or any of the other information stored by the system may be held in any type of memory medium that allows such data to be retrieved. Image data 1100 is what is initially provided to the user and/or system for evaluation.

Figure 6:
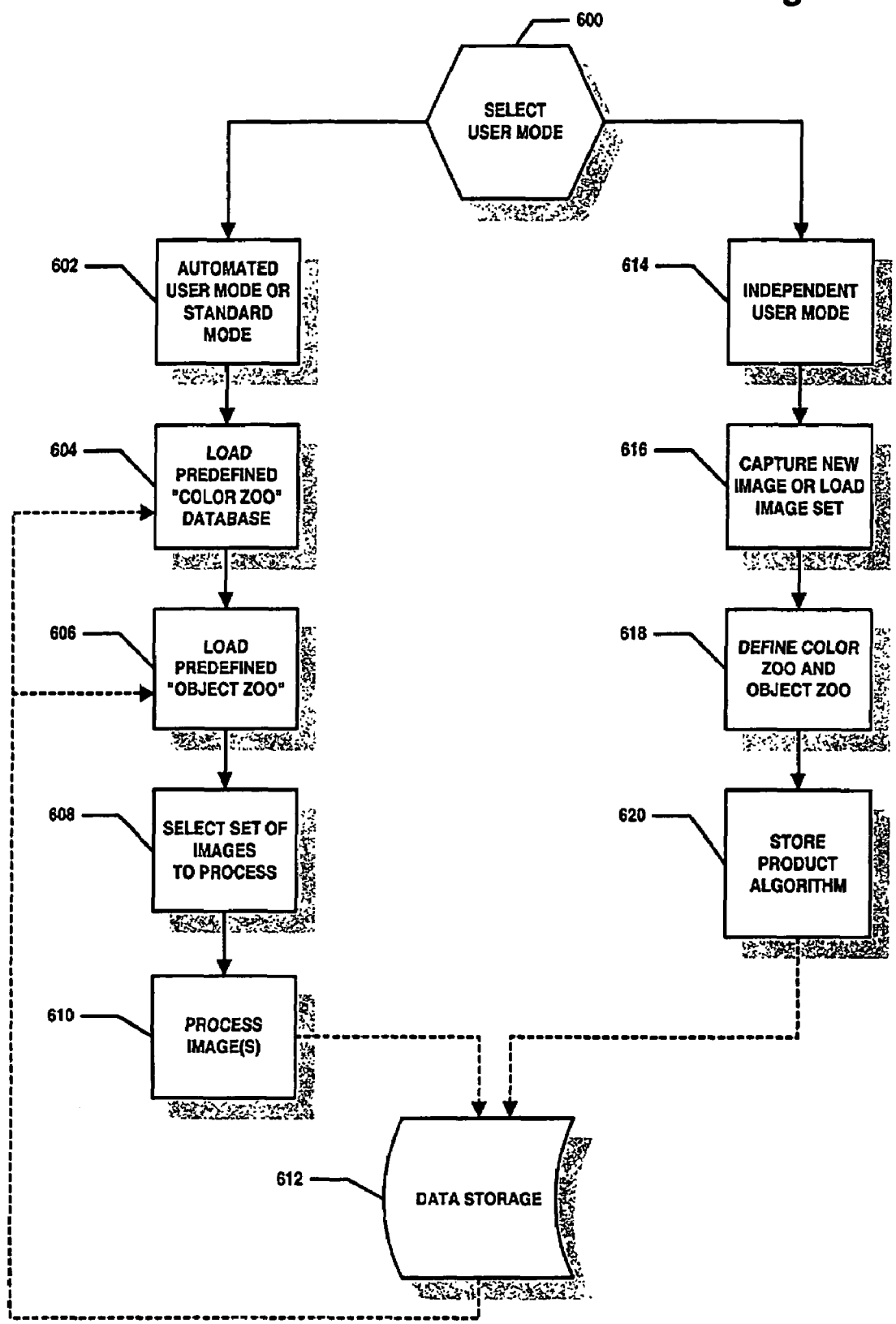
FIG. 6 illustrates the process of selecting and initiating a user mode in accordance with one embodiment of the invention.

Specific Modes of Operation:

Now that a brief overview of the processes and components utilized by an embodiment of the invention has been described, a more detailed discussion of the modes of operation will follow. FIG. 6 illustrates the process of selecting and initiating a user mode in accordance with one embodiment of the invention. When a computer program or system incorporating aspects of the invention initiates, the user may select a user mode (600). If the user selects automated user mode 602, the system loads predefined pixel zoo database 604 and predefined entity zoo database 606 from data storage 612 (the data in the pixel zoo and entity zoo determines a product algorithm). The user then selects a set of images to process (608) and initiates processing (610) of the image data. The specific details associated with that processing and the contents of the databases referred to above are described in more detail in FIG. 8. Subsequent to processing the image data may be stored in data storage 612.

If the user selects the independent user mode 614, the system captures a new image or loads an image set 616. The pixel zoo and entity zoo determining a product algorithm are then defined (e.g., 618) using a recursive series of processing techniques described in further detail in FIG. 9. Once the user is satisfied with the result, the product algorithm can be stored at step 620, the data defining the pixel zoo and entity zoo can be stored in data storage 612, but may also be stored in other locations where the data contained therein can be retrieved for subsequent usage during image processing of the same or different image. Data storage 612 may also contain the image data itself, but like the zoo data, image data may be stored in any location where it can be retrieved.

Figure 7:
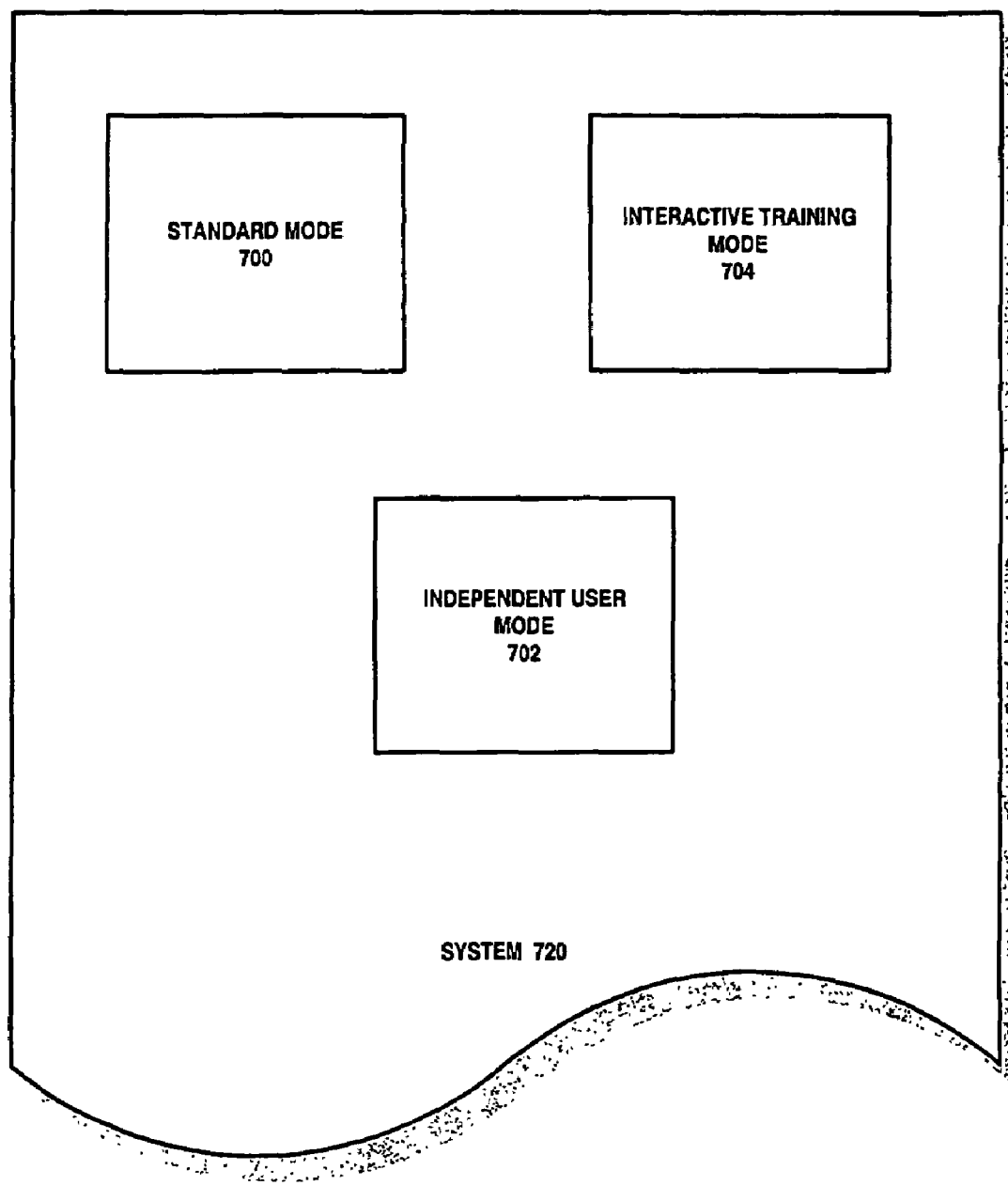
FIG. 7 comprises a block diagram illustrating the various user modes in accordance with an embodiment of the invention.

FIG. 7 comprises a block diagram illustrating the various user modes in accordance with an embodiment of the invention. For example, the system 720 may operate in an automated user mode 700 and an independent user mode 702. The system may operate in one or more of these modes. In automated user mode 700, the system operates automatically to classify the input image with no user intervention required (however, the user may provide input if such input is desirable). When the system is in automated user mode 700 the system takes as primary input one or more images and produces a set of classified images. In one embodiment of the invention, the data stored in the pixel zoo and entity zoo is utilized in automated user mode 700 as a classification aid.

In independent user mode 702 the system is trained to perform classifications in accordance with feedback provided by an independent user. The purpose of operation in independent user mode is to produce tools (e.g., a product or evolving algorithm) that can be used to classify new images supplied to the system in automatic mode. If biological tissue samples are to be analyzed, the independent user may represent a trained histologist or some other user with an expertise in the nuances of evaluating biological tissues. The reader should note that although images of biological tissue samples are used as examples herein, the invention is not limited to analysis of such images. The system embodying the invention may be adapted to evaluate any type of image to classify an object and/or other entity contained in the image. When in independent user mode 702 one embodiment of the invention obtains image data from a repository of images. The output produced in independent user mode may comprise (1) a pixel zoo (e.g., samples of pixel-measure vectors representative of the various different pixel classes in the image); (2) a set of pixel class definitions, where each definition comprises a vector of parameters enabling the system to compute for new pixel chromaticities (e.g., chromatic data points), the probabilities that each pixel belongs to a different pixel classes; (3) an entity zoo (e.g., a collection of images of various different types of possible entities or objects), and (4) a set of entity definitions where each entity definition represents a vector of parameters enabling the system to compute for new entities the probabilities the entity belongs to the various different entity classes. The output generated in independent user mode can be stored and utilized for subsequent processing of other images.

The system's efficacy in automated user mode 700 depends in large part on the expertise the system acquires when operated in independent user mode 702. However, the description of independent user mode is easier to understand once the reader is clear how automated user mode 700 operates. Accordingly, automated user mode 700 is described in detail first. In addition there may be an interactive training mode 704 which can be used to train users how to identify entities. For instance, novice users may utilize the system to learn how to mimic the identification abilities of an expert. Thus the system may present entities previously classified by an expert so that the novice user may gain an understanding of what type of entities fall within which type of classification.

Figure 8:
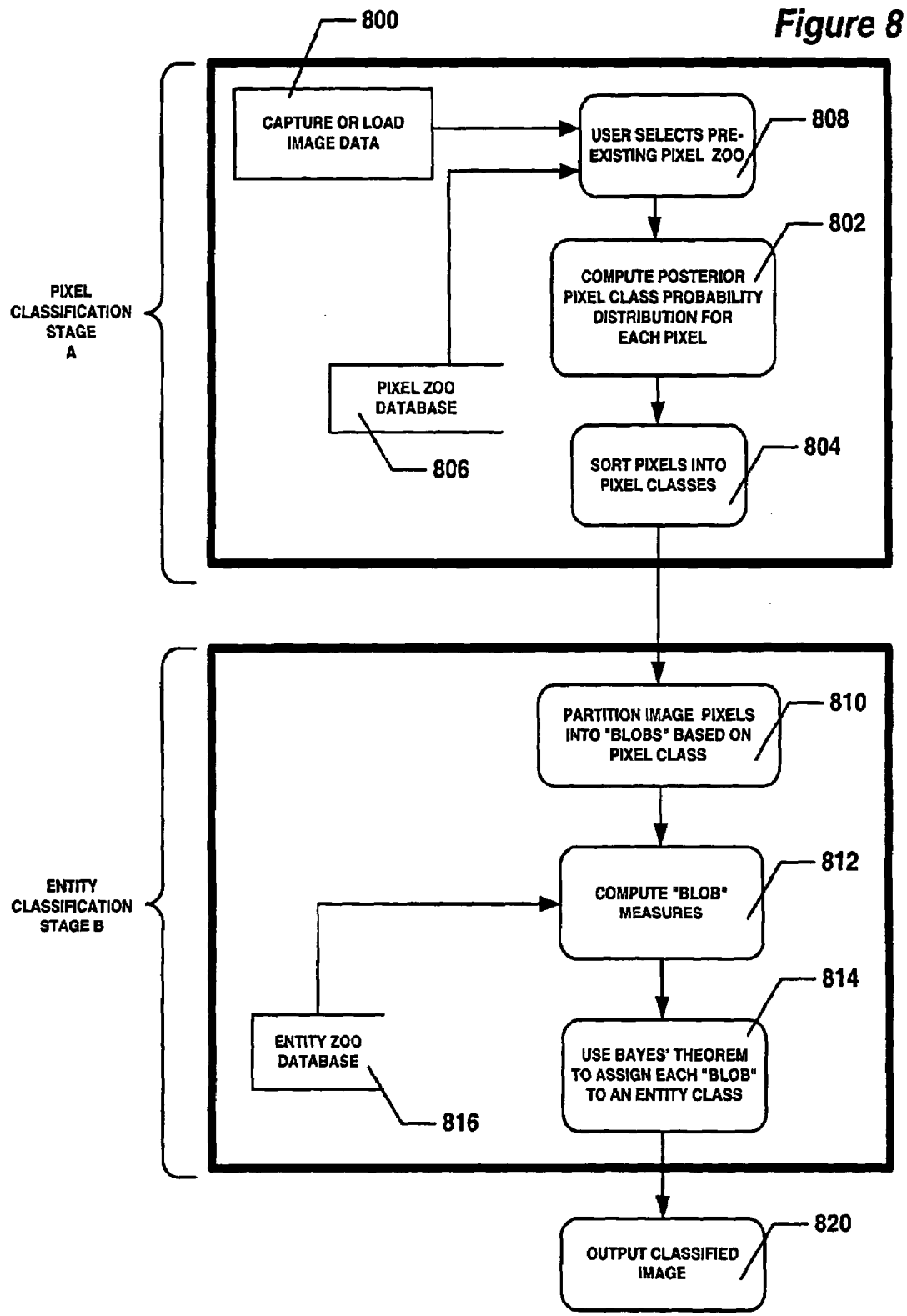
FIG. 8 illustrates the processing steps performed when the system is in automated user mode in accordance with one embodiment of the invention.

Automated User Mode Operation:

A. Image Acquisition:

As was mentioned above, the first step for performing processing on image data is to capture or load the image data (see e.g., FIG. 8, block 800). For instance, if biological tissue data is to be processed, the system will obtain a digitized image I of a tissue sample. The input image I may be loaded from a database or captured directly from a slide using a microscope and CCD camera. To each pixel location (x,y) in the image field, the input image I assigns an m-tuple I[x,y]=($\lambda_1$[x,y], $\lambda_2$[x,y], . . . , $\lambda_m$[x,y]) of light spectral measurements. For human vision, three measurements are typically sufficient to completely represent any color. For this reason, standard CCD cameras and scanning equipment are designed to collect three light spectral measurements per pixel. However, it should be noted that a machine vision application of the sort described herein might well take useful advantage of a potentially richer, higher than 3-dimensional chromatic image representation.

B. Pixel Classification:

The system embodying the invention proceeds to assign each pixel in the Input Image I to one of several possible pixel classes (see e.g., FIG. 8, block 804) which reflect the different general types of material to which that pixel might belong. For example, in a single labeled biological section, two classes are likely to be present: positively labeled entities (densely stained) and the background (weakly stained, or unstained). In double-labeled biological tissue sections, three classes are likely to be present: the primary entities—labeled with one stain, and the secondary entities—labeled with the other stain, and the background. The system can use arbitrary numbers of pixel classes, depending on the chromagens used, and the ways in which different types of biological material interact with them. In the general case, each pixel will be assigned to one of the pixel classes $c_0, c_1, \ldots, c_n$, where $c_0$ conventionally denotes the "background" class, and each of the classes $c_i$, i=1, 2, . . . , n, corresponds to a particular type of spectrally and/or texturally distinct histological material of interest.

A Bayesian classifier is used in one embodiment of the invention to assign pixels to different classes. The user may select a pixel zoo database 806 previously produced 808 by using the system in Independent User Mode. The data held in pixel zoo database 806 is also referred to in accordance with one or more embodiments of the invention as a product algorithm. This pixel zoo comprises representative samples $S_i$ of pixel-measure vectors v=($v_1, v_2, \ldots, v_r$) from each pixel class, $c_i$, i=0, 1, . . . , n. The coordinate values in the pixel-measure vector v[x, y]=($v_1$[x,y], $v_2$[x,y], . . . , $v_3$[x,y]) corresponding to a particular pixel (x, y) typically include the light spectral values, $\lambda_1$[x,y], $\lambda_2$[x,y], . . . , $\lambda_m$[x,y], assigned to pixel (x,y) in the input image, but may also include additional (context-sensitive) statistics reflecting aspects of the configuration of light spectral values assigned to other pixels in the neighborhood of (x, y). Such additional statistics can provide the pixel classification process with sensitivity to textural properties of image material. Typically, the pixel zoo supplied by the user will have been extracted from one or more images whose preparation history is identical or similar to that of the current image(s). Also stored in the pixel zoo are the following parameters, derived from the samples $S_i$:

I. Estimated pixel class prior probabilities. For each pixel class $c_1$, the prior probability p[$c_1$] is the proportion of pixels in the current image that the system expects (based on previous experience) to belong to class $c_1$.

II. Estimated pixel class definitions. Associated with each pixel class $c_1$, is a conditional probability density $f(v|c_i)$. For any possible pixel-measure vector v, and any pixel class $c_i$, $f(v|c_i)$ gives the probability density that a pixel in class $c_i$ will have pixel-measure vector v. That is, for any pixel (x,y), $f(v|c_i)$ is the probability density that I[x,y]=v, given that pixel (x,y) is in class $c_i$. The definition of pixel class $c_1$ is a parametric approximation of $f(v|c_i)$ derived from the sample $S_i$ (e.g., using a modified Expectation Minimization (EM) algorithm). The EM algorithm is modified in one embodiment of the invention so that it updates its parameters after each observation of one new data point. The algorithm generates a mixture of Gaussian probability density functions. Each Gaussian function, called an "expert" in one embodiment of the invention, accounts for a subset of data points. After each observation of a new data point, the algorithm can add, if necessary, an expert to a mixture of experts, which generates the probability density function covering the set of data points given thus far. It also can delete an expert when the expert is found unnecessary after each observation. After all the data points are observed, the algorithm updates the parameters in a batch mode in order to merge down experts, whose fields have a large overlap. As a result, the number of necessary experts is automatically determined and satisfactorily optimized. The term expert should not be confused with expert user that specifically involves human input.

Given (i) the a priori probability p[$c_i$] that any given pixel (x,y) belongs to class $c_i$, and (ii) the conditional probability density $f(v|c_i)$ that a pixel in class $c_i$ is assigned pixel-measure vector v, Bayes' Theorem is now used to compute the posterior probability (See e.g., FIG. 8, Box 802), $$P_i[x, y] = p_{posterior}[c_i \mid v[x, y]] = \frac{p[c_i] f(v[x, y] \mid c_i)}{\sum_{k=1}^{n} p[c_k] f(v[x, y] \mid c_k)}. \quad (1)$$

$P_i$[x,y] gives the probability, based on prior knowledge and current information, that pixel (x,y) is contained in class $c_i$.

Each pixel (x,y) is now assigned to the class $c_i$ for which $P_i[x,y]$ is maximal (see e.g., FIG. 8, Box 804). In one embodiment of the invention these assignments are displayed in a separate window so the user can compare these classifications with the original image to verify system performance. After all pixels have been assigned to pixel classes, the system embodying the invention may proceed to the Entity Classification (e.g., stage B) of processing.

C. Entity Classification

When the system is used in Automated User mode, its goal is to assign each pixel in the image to a particular type of entity (e.g., a histological structure) based not just on color but other features of the entity as well, such as shape, texture, size, etc. The assignment of pixels to distinct pixel classes is one of the steps toward this end. In the next stage of processing, the system (i) groups pixels within a given pixel class into "blobs," (i.e., maximal, spatially connected subsets) and then (ii) uses yet another stage of Bayesian processing, this time based on blob morphology, to assign each blob to its most probable entity class.

1. Partitioning Pixel Classes into Blobs (e.g., Maximal Spatially Connected Subsets):

The first step in entity classification is to partition each pixel class $c_i$ into maximal, spatially connected subsets (i.e., blobs) of pixels (see e.g., FIG. 8, block 810). A set B of pixels is connected in class $c_i$ if $B \subset c_i$, and any pixel in B can be reached from any other pixel in B by a sequence of single-pixel, vertical or horizontal steps without leaving B. B is maximal if there is no strict superset of B that is connected in $c_i$. In practice, one "grows" blobs by (i) initializing the new blob to be a pixel in class $c_i$ that has not yet been included in any maximal blob, and then (ii) recursively including in the new blob any pixel in $c_i$ that is horizontally or vertically adjacent to some pixel that has already been included in the new blob.

2. Application of Blob (Maximal, Spatially Connected Subset) Measures:

To each such subset B (called a blob) the system now applies a battery of morphologically sensitive functions, $\phi_1, \phi_2, \ldots, \phi_q$, called blob measures (e.g., at block 812). A blob measure is a function whose value depends on the pattern of pixel values within, or in the neighborhood of, the given blob. Some examples of blob measures are the total number of pixels composing the blob the length of the blob's boundary divided by the total number of pixels in the blob.

the mean level of chromatic measure $\lambda_i(x,y)$ over all pixels (x,y) within the blob. (Note that to compute this measure requires access to the chromatic information in the original image)

the total number of pixels assigned to pixel class $c_j$ that lie within a distance of 20 pixels of the blob. (Note that to compute this measure requires access to the values of pixels outside the blob).

For a given pixel class $c_i$, there may be various types of entity structure (e.g., cellular structure) that might actually have produced a $c_i$ blob B. Let us denote these different possible entities as $o_{i,0}, o_{i,1}, o_{i,2}, \ldots, o_{i,r(i)}$. Thus, there are r(i)+1 different possible types of entities that can be composed of pixels in pixel class $c_i$. As a matter of convention, the system may let $o_{i,0}$ designate the class of "nonentities" (amalgams of $c_i$ detritus that do not merit classification as any particular sort of entity).

3. Bayesian Blob Classification

As described above, a Bayesian classifier is used to assign pixels to pixel classes; the assignment of blobs to entity classes proceeds similarly (e.g., at step 814). In one embodiment of the invention there are, however, important differences between the blob vs. pixel classification stages. The user is first prompted to supply the name of an entity Zoo 816. This Entity Zoo comprises representative samples $T_{i,j}$ of blobs from each entity class, $o_{i,j}$, i=0, 1, . . . , n; j=0, 1, . . . , r[i]. (i.e., $T_{ij}$ is a set containing many examples of blobs from pixel class $c_1$ that belong to entity class $o_{ij}$). Also stored in the Entity Zoo are various parameters derived from the samples $T_{ij}$.

It should be noted that these samples $T_{ij}$ may well comprise blobs that have been obtained in the past from a range of different tissue images (e.g., images from different parts of the brain, from different patients showing different symptoms). In this respect, the Entity Zoo is likely to differ from the pixel zoo. The point here is that one expects pixel color to depend on the particular staining history of a given sample. However, the morphology of a particular histological structure of interest is likely to be largely invariant with respect to changes in the source of the image being analyzed. However, what is likely to vary systematically as a function of changes in image source is the prior probability of finding different varieties of entities.

I. Estimated entity class prior probabilities. For each entity class $o_{ij}$, the prior probability $p[o_{ij}]$ is the proportion of $c_1$ blobs in the current image that the system expects (based on previous experience) to belong to class $o_{ij}$. Such factors as brain region of sample, genetic information, demographics, sex, disease presence, disease subtype, subtype of individual (including race), disease severity, prior medical history, etc. are used (e.g., in the context of a general linear model) to estimate $p[o_{ij}]$ from the entity zoo. In addition entities may be compared with other non-visual data (e.g., genetic information, demographics, sex, disease presence, disease subtype, severity of the disease, subtypes of individuals including race, disease severity, prior medical history, genetic profiles). Entities can also be compared to data sets derived from similar sources containing genetic profiles of individuals (e.g., gene fingerprints).

II. Estimated entity class definitions. Suppose our blob measures are $\phi_1, \phi_2, \ldots, \phi_q$, and define the vector-valued function of $\phi$ of blob-measures by $$\phi(B)=(\phi_1(B), \phi_2(B), \ldots, \phi_q(B)) \quad (2)$$

for any $c_i$ blob B. Associated with each entity class $o_{i,j}$ is a conditional probability density $f(w|o_{i,j})$. For any blob-measure vector $w$, $f(w|o_{i,j})$ gives the probability density that a blob in class $o_{i,j}$ will have blob-measure vector w. That is, for any $c_1$ blob B, $f(w|o_{i,j})$ is the probability density that $\phi(B)=w$, given that B is in entity class $o_{i,j}$. The definition of entity class $o_{i,j}$ is a parametric approximation of $f(w|o_{i,j})$ derived from the sample $T_{i,j}$.

Given (i) the a priori probability $p[o_{i,j}]$ that a given $c_1$ blob belongs to class $o_{i,j}$, and (ii) the conditional probability density $f(w|o_{i,j})$ that a blob in class $o_{i,j}$ is assigned blob-measure vector w, Bayes' Theorem is now used for each $c_1$ blob B to compute the posterior probability (see e.g., FIG. 2, block 814), $$P_{i,j}[B] = \frac{p[o_{i,j}]f(\phi(B) \mid o_{i,j})}{\sum_{k=0}^{r[i]} p[o_{i,k}]f(\phi(B) \mid o_{i,k})} \quad (3)$$

Given our previous knowledge, and the results of applying the vector-valued function of blob measures to B, $P_{i,j}[B]$ gives the probability that B is actually an entity of type $o_{i,j}$. We now assign B to whichever entity class, $o_{i,j}$, j=0, 1, . . . , r(i), it most probably belongs.

In one embodiment of the invention, the classified image is now returned as output (e.g., step 820). In other embodiments of the invention, the blob classifications achieved in this stage of processing are treated as tentative, rather than final, and are channeled into a second phase of pixel-classification in which the original assignments of pixels to different classes are subject to revision in light of the tentative entity classifications. The output from this second stage of pixel classification is then submitted to another stage of blob-classification. This process may recur several times before a final classification is returned.

Figure 9:
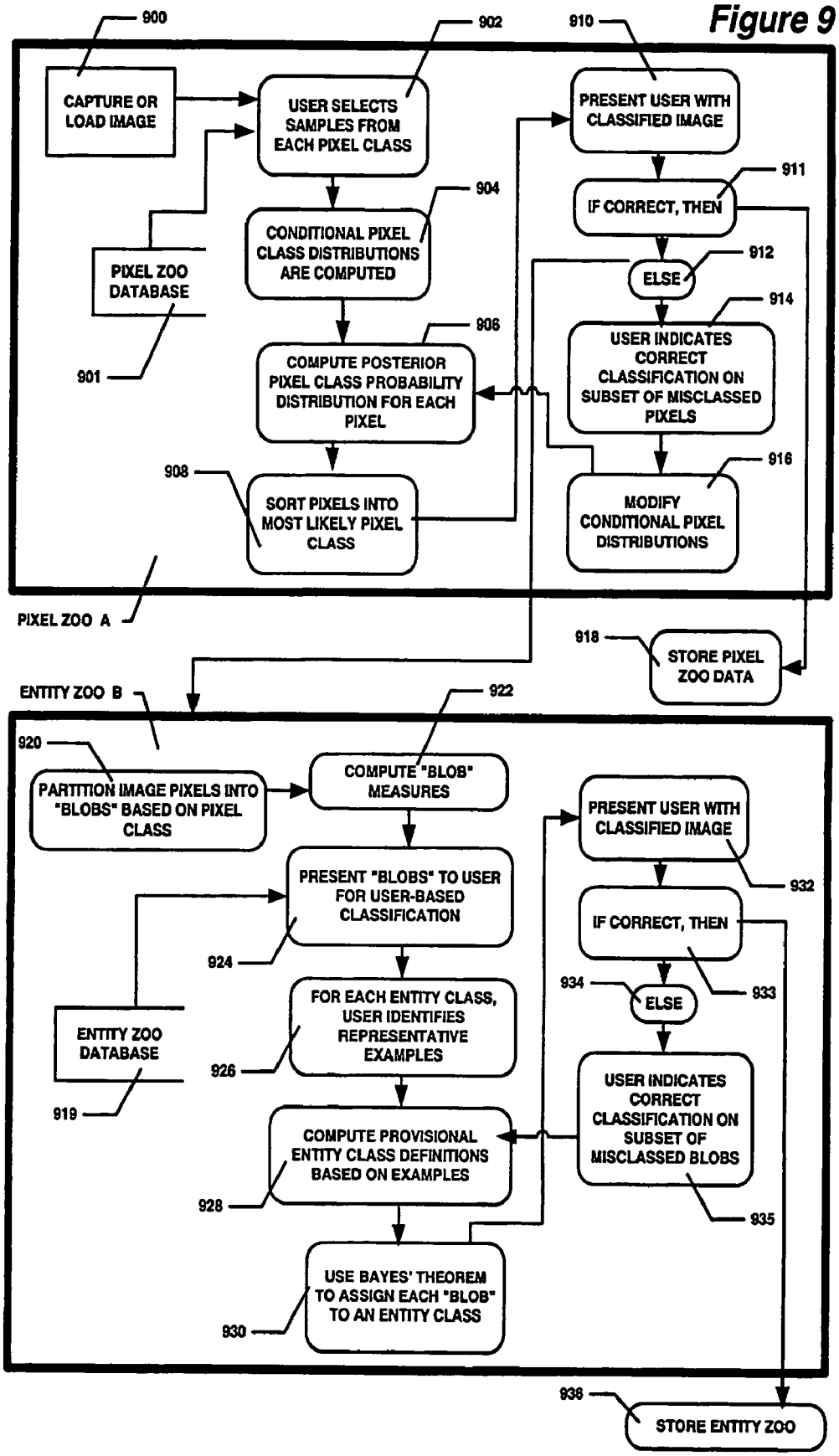
FIG. 9 illustrates the processes associated with the independent user mode in accordance with one embodiment of the invention.

Independent User Mode Operation:

When the system embodying the invention is used in Automated User mode, the input is a digitized image, and the output is an image containing blobs that have been classified as various sorts of histological entities. Before the system can be operated in Automated User mode, however, the pixel classes, $c_i$, i=0,1, . . . , n, and entity classes $o_{i,j}$, i=1, 2, . . . , n; j=0, 1, . . . , r(i), should be defined. In one embodiment of the invention, defining the pixel and entity classes (e.g., building a product or evolving algorithm) is the purpose of operating the system in Independent User Mode. FIG. 9 illustrates the processes associated with the independent user mode in accordance with one embodiment of the invention. Input for the independent user mode is typically retrieved interactively from an archive of digitized images (e.g., 900) specified by the user. Output comprises:

(1) a Pixel Zoo (e.g., 918) comprising representative samples $S_i$, i=0, 1, . . . , n, of pixel-measure vectors from each pixel class, (2) Pixel class Definitions based on the pixel zoo samples (e.g., 901) $S_i$, (i.e., parametric estimates of the conditional densities $f(v|c_i)$ of obtaining pixel-measure vector v, given that v is generated by a pixel in pixel class $c_i$), (3) an Entity Zoo (e.g., 919) comprising many representative samples $T_{i,j}$ of blobs from each entity class, and (4) Entity Class Definitions based on the entity zoo samples $T_{i,j}$ (i.e., parametric estimates of the conditional densities $f(w|c_{i,j})$ that $\phi(B)=w$, given that B is an entity of type $o_{i,j}$)

A. Pixel Zoo Generation:

After having obtained a new digitized, tissue sample image (e.g., at block 900, which executes as described above with respect to block 800 of FIG. 8). The system configured in accordance with one embodiment of the invention prompts the user to either (i) provide a sample $S_i$ of pixels belonging to each of the classes $c_i$, i=0, 1, . . . , n (where n is specified by the user), or else to (ii) read in the parameters defining conditional densities, $f(v|c_i)$, which have been previously obtained from a similar tissue sample and stored along with an associated pixel zoo (e.g., 901).

If it is necessary to estimate conditional densities $f(v|c_i)$ from the current sample, the system may obtain a sample set as follows: For a given class $c_i$, the user selects the required $S_i$ by mouse-clicking several regions of the image filled with pixels from class $c_1$ (e.g., at block 902). The sample $S_i$ may be referred to as the zoo sample of pixel class i. The system may use a flood-fill procedure to grab all pixels in the neighborhood of the mouse-clicked pixel whose pixel-measure vectors are similar to the pixel-measure vector of the clicked pixel, at the same time showing the user exactly which pixels have been included in the sample. Alternatively, an eyedropper procedure may be used to add individual pixels to the sample $S_i$.

After zoo samples (e.g., a sample set) have been collected for each pixel class, The system estimates the conditional densities $f(v|c_i)$, i=0, 1, . . . , n from the obtained samples (e.g., at block 904).

If the pixel classes being defined in the current application of the system are completely new, then prior probabilities $p[c_i]$, i=0, 1, . . . , n are taken (by default in one embodiment of the invention) to be uniform: i.e., $$p[c_i] = \frac{1}{n+1},$$

i=0, 1, . . . , n. Typically, however, previously classified images will be available from which it is appropriate to derive estimates of prior probabilities. This will be the case, for example, when the previous images are of the same type of tissue as the current images, and are stained with the same combination of chromogens as was used for current images. If the only differences between the current image and previously classified images involve depth of staining, for example, then pixel classes in the current sample are expected to be generated by the same types of histological entities as were the pixel classes in the previous samples. In this case, the user can supply the name of the image archive from which priors are to be estimated. Prior probabilities are then estimated by setting $p[c_1]$ equal to the proportion of pixels in the specified image population that were assigned to class $c_1$.

The system proceeds to apply Eq. (1) to the pixel-measure vectors of pixels in the current image (e.g., at block 906), and to assign each pixel to its most probable pixel class (e.g., at block 908). The classified image is now presented, (e.g., side by side) with the original, so that the user can check that the classification is correct (e.g., at block 910). If the classification is incorrect or has room for improvement in the opinion of the user (e.g., at block 912), the user provides feedback to the system, indicating how misclassified pixels should have been classified (e.g., at block 914).

Based on this feedback, the system (1) moves misclassified pixels from their current pixel zoo samples to the correct samples, (2) revises its estimates of conditional densities $f(v|c_i)$, i=0, 1, . . . , n (e.g., at block 916) in view of the feedback obtain from the user. The user also has the option of adjusting the estimates of prior probabilities to reflect the proportions of pixels assigned to the different pixel classes in the current image. However, if estimates of priors were originally based on a large sample of previously classified images, then the user may prefer to retain the current estimates without alteration (see e.g., at block 911).

Then the system applies Eq. (1) once again to every pixel value I[x,y] in the image (e.g., executes block 906), and once more assigns each pixel to its most likely pixel class (e.g., block 908). Then the reclassified image is presented once more (e.g., side by side with the original) for the user to check veracity (e.g., block 910).

This process repeats until the user is satisfied with the classification. After the user has ratified the classification, the Pixel zoo $Z_{pixels}$ is stored as output (e.g., 918). $Z_{pixels}$ comprises I. the samples $S_i$, i=0, 1, . . . , n. (Each sample $S_i$ contains many pixel-measure vectors belonging to pixel class $c_1$.)

II. the prior probability estimates, $p[c_1]$, i=0, 1, . . . , n.

III. the estimated conditional densities $f(v|c_i)$, $i=0, 1, \ldots, n$.

Once the pixel zoo has been produced and stored, the system proceeds to Entity Zoo construction.

B. Entity Zoo Construction and Entity Definition:

As when the system is operated in Automated User Mode, the image is now partitioned into blobs based on pixel class (e.g., at block 920), and for each blob B, $\phi(B)$ is computed (Eq. (2)) (e.g., at block 922).

1. Entity Zoo Initialization:

The pixel-classified image is presented to the Independent user for feedback (e.g., side by side with the original, digitized image) (e.g., at block 912). Then for each pixel class $c_i$, the user begins by indicating ((e.g., at block 924) with mouse clicks or other input) several blobs (e.g., approximately 5 in one embodiment of the invention, but the system may use more or less) in entity class $o_{i,0}$, then several in class $o_{i,1}$, then several in class $o_{i,2}$, etc. successively for each entity class in pixel class $c_i$. (It may be that more than one image must be accessed in order to obtain a sufficient number of entity examples in each class.) Let $T_{i,j}$ be the sample of blobs selected by the Independent user as examples of entities belonging to class $o_{i,j}$ (e.g., at block 926).

In addition to initializing the entity zoo, the system may also need to initialize the a priori probabilities of different entity classes. For $i=1, 2, \ldots, n$; $j=0, 1, 2, \ldots, r(i)$, the a priori probability $p[o_{i,j}]$ that a randomly chosen blob in pixel class $c_i$ is actually an entity of type $o_{i,j}$ is initialized to the uniform distribution. That is, the system may initially set $$p[o_{i,j}] = \frac{1}{r(i)+1}.$$

2. Definition Estimation:

Our target is an adequate estimate of the function $f(w|o_{i,j})$, which is called the definition of entity class $o_{i,j}$. For any blob B in pixel class $o_i$, $f(w|o_{i,j})$ gives the conditional probability density of the vector value $w=\phi(B)$, given that B is in class $o_{i,j}$. The system can base a current estimate on the examples currently in the entity zoo, and iteratively refine this definition by adding new examples of different entities to appropriate entity zoo samples, $T_{i,j}$.

For each entity zoo sample $T_{i,j}$, $i=1, 2, \ldots, n$; $j=0, 1, \ldots, r(i)$, The system computes the vector-valued function $\phi(B)$ of blob measures for each blob B assigned to $T_{i,j}$. This yields sample of (q-dimensional) points $w=\phi(B)$ that is now used as the basis for a parametric estimate of $f(w|o_{i,j})$ (which may be derived, for example, using a variant of the EM algorithm) (e.g., at block 928). The estimated function $f(w|o_{i,j})$ has the following porperties: (1) $f(w|o_{i,j})$ is non-negative for all $v \in R^q$, (2) the integral of $f(w|o_{i,j})$ over all $w \in R^q$ is equal to 1, and (3) $f(w|o_{i,j})$ takes high values in regions of $R^q$ containing values $\phi(B)$ for many blobs B assigned by the Independent user to class $T_{i,j}$, and low values elsewhere.

3. Entity Classification (e.g., Block 930)

Once the system has an estimate of the definition $f(w|o_{i,j})$ for each entity class $o_{i,j}$, these definitions are applied in the context of a Bayesian classification procedure in order to classify the blobs, either in the current image, or else in a new image.

For each $c_i$ blob B in the current image, B is classified using Bayes' Theorem (Eq. (3)) to obtain for each entity class $o_{i,j}$ the posterior probability $P_{i,j}[B]$ that B is in class $o_{i,j}$.

Given the systems previous knowledge, and the results of applying morphological measures to B, $P_{i,j}[B]$ gives the probability that B is actually an entity of type $o_{i,j}$. The system proceeds to assign B to whichever entity class, $o_{i,j}$, $j=0, 1, \ldots, r(i)$, B most probably belongs.

4. User Validation and Zoo Expansion

The classified image is presented to the user for feedback. For instance, the classified image can be presented with each blob color-coded to signal the entity class to which it has been tentatively assigned (e.g., at block 932). The user reclassifies any obviously misclassified blobs (e.g., at block 934) that he/she detects by selecting them with the mouse and indicating their proper classes. The blobs singled out by the user as having been misclassified are added to the correct entity zoo samples (e.g., at block 935).

If the Independent user judges that all of the remaining blobs in the image have been correctly classified, (e.g., at block 933) he/she can instruct the system to include all blobs in the entity zoo samples corresponding to the entity classes to which they have been assigned.

Alternatively, if many errors remain in the tentative classification produced by the system, the Independent user can select individual blobs for inclusion in one or another entity zoo sample.

Prior probabilities may now be recomputed. If the proportions of blobs included in the various entity zoo samples may be assumed to approximate the proportions in the population at large, then the Independent user may instruct the system to base its new estimate of the prior probabilities on the updated zoo samples. In this case, one embodiment of the system uses a general linear model to estimate $P[o_{i,j}]$ as a function of the information associated with the current image (e.g., sex, diagnosis and age of death of patient, region of brain from which the sample was taken, etc.).

Alternatively, if the Independent user judges that the sizes of the entity zoo samples do not reflect the proportions of different types of entities in the population at large, the Independent user may opt to continue using the previous prior distribution.

5. Termination

The system iterates stages Definition estimation, Entity classification, and User validation and zoo expansion until the user terminates the process (typically, when the Independent user is satisfied that the system automatically classifies new entities correctly on the basis of the entity definitions derived from the entity zoo samples). At this point the system produces as output the entity zoo $Z_{entities}$. $Z_{entities}$ comprises I. the samples $T_{i,j}$, $i=0, 1, \ldots, n$, $j=0, 1, \ldots, r[i]$ (Each sample $T_{i,j}$ contains many blobs belonging to entity class $o_{i,j}$.) Associated with each blob in $T_{i,j}$ is all the information about the source of the tissue from which it was derived.)

II. the prior probability estimates, $p[o_{i,j}]$, $i=1, \ldots, n$, $j=0, 1, \ldots, r[i]$.

III. the estimated conditional densities $f(w|o_{i,j})$, $i=0, 1, \ldots, n$, $j=0, 1, \ldots, r[i]$.

The pixel zoo (e.g., 918) and entity zoo (e.g., 936) output generated by the system in cooperation with feedback from the user is referred to in one embodiment of the invention as a product algorithm, and such output may be applied to multiple images likely to contain entities to be classified.

Neural Network Engine:

As mentioned above, the system may comprise a neural network engine configured to evaluate image data. The detailed aspects of the neural network engine and the functionality associated therewith will now be described in further detail. A specific instance of image processing (classifying histological structures in brain slices) is utilized for illustrative purposes. However, the same technique is applicable to processing and classifying any other type of image data.

The neural network is configured to classify entities in image data (e.g., histological structures such as senile plaques). In this instance the neural network utilizes Fourier shape descriptors of plaque entity boundaries as inputs, and is evolved via genetic algorithms, rather than trained (although it may be trained). When a spatially connected subset is presented, the neural network classifier engine traverses the perimeter of the spatially connected subset and derives relative harmonic amplitudes from the perimeter. Then, the neural network classifier accepts the relative harmonic amplitudes and returns the index of the output neuron that gives the largest value as the classification result for the spatially connected subset. In one embodiment of the invention, the network is pre-trained through genetic algorithms with a small set of training data. The results are presented to the user so that the user can confirm each classification result, and if the classification is wrong, train the network through back-propagation by indicating the correct classification. The user also can save and load the network that he/she trained for his/her later use. Over time the systems ability to accurately classify entities in an image will improve. Embodiments of the invention utilize a set of one or more evolving algorithms linked together to analyze features of the image data based on the identification information provided by the user. For instance, the system may utilize the entity classification algorithms described above alone or in combination with the neural network engine.

Neural Network Image Processing Example:

A specific example of an embodiment of the invention implemented in computer software to isolate, classify, and count entities in digitized images of histological structures will now be described. The reader should note, however, that the same techniques may be utilized to process any type of image data comprising entities. In this example, each histological section has entities such as senile plaques or tangles and the invention provides a way to count the number of senile plaques and tangles in the histological image. Histologists and the computer application often disagree when it comes to the classification of plaque-type entities, which are initially classified by pixel color (the way many current systems operate). The disagreement arises when it comes to deciding how many plaques the identified entity contains. The neural network classifier described herein narrows the gap between histologists and the computer application.

Given the image of a histological entity, the main task of the entity classifier is to tell if it is a single entity or multiple entity, and moreover, to determine how many overlapping sub-entities the entity is made of. For instance, the system executing an embodiment of the invention can distinguish single entities from multiple entities. Among a variety of measures suitable for this purpose, the shape information of an entity's perimeter helps determine how many entities are present or whether there is any overlap. The system may acquire this information in terms of Fourier descriptors of an entity's perimeter. The system may also be configured to acquire information such as an entities size, shape, color, texture, or other distinguishing features. Once the system obtains the information it may utilize for entity classification, it executes an algorithm to process that data that is stochastically robust. In one embodiment of the invention, the system passes feature information (e.g., relative harmonic amplitudes) to a neural network. A set of connection weights on the neural network is determined via genetic algorithms, which can effectively search a huge space so that a globally optimal, or nearly optimal, set of connection weights will be found.

Fourier Descriptors:

Fourier descriptors may be utilized to analyze the shape information of closed curves. Assume that $z(l)$ describes a closed curve in the complex plane, where $z(0)$ is a starting point that can be chosen arbitrarily and $l$ is the length of the curve traced counterclockwise from the starting point. Further assume that L is the length of the whole curve so that $z(0)=z(nL)$ for any integer n. Then $z(l)$ can be represented as a series of complex exponentials.

$$z(l) = \sum_{n=-\infty}^{+\infty} z_n e^{j\omega nl}$$

$$= z_0 + \sum_{n=1}^{+\infty} \underbrace{\{z_{-n} e^{-j\omega nl} + z_n e^{j\omega nl}\}}_{elli_n(l)},$$

where $\omega = 2\pi/L$ and $z_n$, called an n-th Fourier descriptor or harmonic element for $n \in \{-\infty, \ldots, 0, \ldots, \infty\}$ is a complex number. In this example, $z_0$ is the center of gravity of the curve; thus an embodiment of the system can ignore $z_0$ as it is typically uninformative about the shape of $z(l)$. Each term $$z_{-n} e^{-j\omega nl} + z_n e^{j\omega nl}$$

describes an ellipse. Thus, a pair of Fourier descriptors, $z_n$ and $z_{-n}$ is called an elliptic Fourier descriptor. The ellipse, $elli_n(l)$, is covered n times while $l$ changes from 0 to L.

As mentioned, $z_n$ for $n \in \{-\infty, \ldots, 0 \ldots, \infty\}$ is a complex number; thus, $$z_n = \text{Re}(z_n) + j \times \text{Im}(z_n)$$
$$= |z_n| e^{j\Phi_n},$$

where $\text{Re}(z_n) = |z_n|\cos(\Phi_n)$, and $\text{Im}(z_n) = |z_n|\sin(\Phi_n)$.

$|z_n|$ is called an n-th harmonic amplitude, and $\phi_n$ is an n-th harmonic phase. In each ellipse, $elli_n$, there are two harmonic amplitudes and phases, $|z_{-n}|$, $|z_n|$, $\phi_{-n}$, and $\phi_n$. In general, $|z_{-n}|$ and $|z_n|$ together determine the size of the ellipse. More precisely, the sum of these two values is the long radius of the ellipse, and the difference of these two is the short radius. On the other hand, $\phi_{-n}$ and $\phi_n$ determine the orientation of the ellipse.

In practice, Fourier descriptors are calculated by a discrete Fourier transform algorithm after extracting an N-point boundary, $\{z(kL/N)\}$, where k ranges from 0 to N−1. The larger N is, the more precise the Fourier descriptors become. The size of N may be dictated by time and memory constraints and N should therefore not be too large. It is also convenient to make N a power of two because fast Fourier transform algorithms can be effectively implemented in that case. Once the system obtains Fourier descriptors of a given closed curve, the system can reconstruct the curve from its Fourier descriptors. The more descriptors the system use, the more closely the system can approximate the original curve. FIGS. 13, 14 and 14 are reconstructed outline curves of FIG. 12 (element 1200). The difference among these three is the number of harmonics used. These closed curves (e.g., 1300, 1400, and 1500) may be described as $$z'_k(l) = \sum_{n=1}^{k} elli_n(l),$$

where k=10 for FIG. 13, k=20 for FIG. 14, and k=30 for FIG. 15. If the system uses only low order descriptors, the reconstruction of the curve tends to exclude fine detail.

Fourier Descriptors of Plague-Like Entities

Histological entities (e.g., cells, nuclei, neurons, astrocytes, senile plaques) often take very complicated, distorted shapes with ragged edges. However, the raggedness is usually indicative of noise the system can filter out and contributes primarily to higher order harmonic elements. Thus, for the pattern recognition of those entities, only the lower order harmonic elements are used in one embodiment of the invention. Moreover, harmonic amplitudes are typically more vital than harmonic phases. Harmonic phases are very sensitive to starting points, z(0). Even if two entities are of the same shape and size, harmonic phases for one are different from those of the other if one entity is a rotated image of the other. However, harmonic amplitudes of the one are identical to those of the other under such conditions. Thus, an embodiment of the invention focuses attention on harmonic amplitudes although the use of harmonic phases may be justified by considering the shifts of phases relative to $\phi_1$, i.e., $\phi_n - \phi_1$.

If the system is solely interested in the shapes of the entities, the system can further simplify the matter. As mentioned earlier, $|z_{-n}|$ and $|z_n|$ together determine the size of the ellipse, $elli_n(l)$. In fact, $|z_{-1}|$ and $|z_1|$ together usually give a rough estimate of entity size.

However, the information of entity size is obtained in one embodiment of the invention by counting pixels. Thus, by making all $|z_n|$'s relative to the largest one, the system can simplify the neural network entity classifier. Some merits of this conversion are that the magnification scale of images becomes less important and an optimal set of connection weights becomes easier to obtain because the neural network classifier may work with input values from the restricted domain, [0,1].

FIGS. 17 and 19 show relative descriptor amplitudes of plaque (e.g., entity 1600 & 1800) samples shown in FIGS. 16 and 18, respectively. Top rows A show $|z_n|$, bottom rows B show $|z_{-n}|$, and n ranges from 1 to 30 from left to right. In both cases, $|z_1|$ is the largest amplitude, and all other amplitudes are made relative to it.

These Figures illustrate that in one embodiment of the invention only lower order harmonic amplitudes make any significant contribution to the shapes. Second, FIGS. 17 & 19 contain useful information to help distinguish these two shapes. Note in particular that both $|z_{-1}|$ and $|z_3|$ are substantially larger in FIG. 19 than in FIG. 17. Indeed, this is usually true when the system compares a double plaque entity to a single plaque entity. $|z_3|$ tends to be larger when a shape is elongated rather than circular, and $|z_{-1}|$ tends to be larger for shapes that deviate from ellipses by being pinched on opposite sides. Such shapes are marked by opposing concavities such as are evident in FIG. 18.

Identifying entities that are made of three or more overlapping plaques is not this easy. Because there are so many topological variations in their shapes, two entities in different classes may happen to take a similar shape. Even though they are different to our eyes, they may show a similar spectrum of harmonic amplitudes. FIG. 21 shows the descriptor amplitudes (A, B) obtained from the plaque image (2000) in FIG. 20.

Another problem is that higher order harmonics will contribute to the shapes of compound plaques. Those higher order harmonics may be considered as noise, and thus ignored mistakenly. As a result, those entities may be misclassified. However, note that their descriptor amplitudes are still clearly different from descriptor amplitudes of single plaques as is evident from FIGS. 17 and 21. Therefore, the system can easily distinguish them from single plaques.

Neural Network Entity Classifier:

A neural network may be utilized to aid the system in allowing a set of connection weights evolve by genetic algorithms, rather than training such connection weights by back propagation. Genetic algorithms can search a huge space for globally optimal, or nearly optimal, solutions. By contrast, back propagation is a hill-climbing training method, which is simple, straightforward, but likely to get stuck with a locally optimal set of connection weights.

Genetic algorithms are search algorithms based on natural selection. They maintain a population of individuals $P(t)=\{x_{1,t}, \ldots, x_{n,t}\}$ for generation t. Each $x_{nj}$ represents a potential solution to a given problem. Each potential solution is evaluated to give some measure of its fitness. Then, the new population $P(t+1)$ is formed by selecting the fitter potential solutions from $P(t)$. Some new individuals undergo transformations by genetic operators, such as mutation and crossover. After some number of generations, the population converges such that the best individual in the population represents a nearly optimum solution.

In a typical feed-forward neural network, an input to a neuron, except to input neurons, is a weighted sum of all outputs from the neurons on the previous layer. Those weights are called connection weights. These parameters determine the behavior of the neural network.

Genetic Algorithm for Neural Network

Genetic algorithms typically utilize a simple data representation which is commonly referred to as a chromosome, and to which genetic operations, such as mutation and crossover, can be applied. In this approach, each connection weight is represented in a 32 bit long vector (although other bits lengths may be utilized). With this 32 bit long vector, the system represent a real number ranging from −128 to +128 with $2^{-24}$ step width, to narrow down the search space for practicality. All connection weights are concatenated so that they form a chromosome which is actually a long bit vector. The number of input, output, and hidden layer neurons are fixed in our approach; therefore, each chromosome is a bit vector of fixed length. Mutation is a random change on a randomly chosen bit of a chromosome, and crossover between two chromosomes is an exchange of corresponding bits from a randomly chosen crossover point to the end of the chromosomes.

Fitness Function

Selection by fitness is an essential part of genetic algorithms. The selection process evaluates the fitness of each chromosome, sort chromosomes by fitness, discard the bottom half of them, and duplicate the rest.

On the other hand, fitness functions typically require some elaboration in order to make a genetic search work. The system is configured to find a set of connection weights with which the neural network classifier can classify entities as correctly as possible. However, accuracy alone is hardly a sufficient fitness criterion.

Consider the following fictitious situations. If it is sunny in Southern California, say 85% of the year, every weatherman can claim that his weather forecast is 85% accurate. All that a weatherman has to do is always to say that it will be sunny tomorrow. He needs to make no calculation or analysis to produce his forecast. However, he will not be able to get a job as a weather man in San Francisco or Seattle.

A similar situation may occur in entity classification problems. For example, the majority of plaque entities to be classified happen to be single plaques. Under such a condition, the neural network classifier may evolve itself to classify every plaque entity as a single plaque if accuracy is the only criterion to measure the fitness of a set of connection weights. When the system uses classification accuracy as the only criterion to measure fitness this can occur.

One solution for this is to make the base data set for fitness evaluation comprise equal numbers of entities from all classes, and randomly select the data set for fitness evaluation from the base set every time the fitness of a chromosome is measured. This not only prevents the classifier from becoming over-fit to a particular data set, but also makes the algorithms as fool-proof as possible. Though this strategy alleviates the symptom, it is still possible to overlook a chromosome that results in a cheater neural network.

To reduce the likelihood of evolving cheater networks, the system introduces an additional heuristic for fitness evaluation. Specifically, the system measures the Euclidean distance between the probability distribution of plaque entities in a data set for fitness evaluation and the probability distribution of the outputs from the neural network with a given chromosome.

$$\|d_t - d_o\| = \sqrt{\frac{\sum_{i=1}^{k}(d_t(i) - d_o(i))^2}{k}},$$

where k is the number of different plaque classes, and for i=1,2, . . . ,k, $d_t(i)$ gives the proportion of plaque images in the test data set belonging to class i, and $d_o(i)$ gives the proportion of images assigned to class i by the network. Since the test data set is randomly chosen for each fitness evaluation, this heuristic gives us a measure of how honestly the neural network with a given chromosome does its job.

The actual fitness of each chromosome is given by the equation:

fitness=error_rate$^2$×(1+$\|d_t-d_o\|$).

The error rate is squared and multiplied by (1+∥dt−do∥) because the system typically believes that the decrease in the error rate outweighs the decrease in ∥dt−do∥. The smaller the fitness value is, the fitter the chromosome is.

Neural Network Evolution

The neural network classifier utilized in embodiments of the invention to classify plaque-like entities may comprise 20 input neurons, two hidden layers, each of which consists of 16 hidden units, and 5 output neurons. Thus, the system uses a feed-forward network with three layers of adaptive weights (the number of layers and adaptive weights may vary). The bias parameter is added to the input layer. Since networks having three layers of weights can generate arbitrary decision regions, which may be non-convex and disjoint, the resulting network can recognize any type of entity.

The neural network utilized by one embodiment of the invention accepts twenty relative descriptor amplitudes, $|\acute{z}_n|$ and $|\acute{z}_{-n}|$ for n=1,2, . . . , 10, where $$|\acute{z}_n'| = \frac{|z_n|}{M},$$

where M=max{$|z_k|$ $|k=\pm1,\pm2, \ldots ,\pm10$}. Each output neuron corresponds to a specific class of entities. The outputs of all output neurons are compared. Then, the index of the output neuron which gives the largest value is returned as the class of the input plaque entity.

The genetic algorithm utilized in one embodiment of the invention is applied to connection weights. Since there are 672 weights, each of which is represented in a 32 bit long vector, a chromosome in our genetic algorithm is 21,504 bits long. There are 400 chromosomes vying for survival. In one specific test, images comprising 43 single plaques, 48 double plaques, 39 triple plaques and 23 quadruple plaques were obtained. The expert user thresholded those images, calculated Fourier descriptors of each entity in the image and classified them to form a base data set for fitness evaluation in the genetic algorithm. Although the neural network can classify up to 5 classes, the expert user may provide samples for only 4 classes because the system could hardly find any plaque entities that are made up of 5 or more simple plaques. A test data set is set up at each fitness evaluation phase by randomly sampling 100 entities from the base set with replacement.

At every generation, chromosomes mutate and crossover. Next, they are evaluated by actually setting up all connections of the network from each chromosome and testing the network on a randomly chosen test data set. Then, chromosomes are sorted by their fitness values and selected. The surviving chromosomes reproduce themselves. The evolution lasts for 400 generations. After the evolution ends, the best chromosome is picked.

The neural network which has evolved in this manner can discriminate single plaques from other classes of plaque entities within the base test data set with 95% accuracy. The classifier also can classify plaque entities into three classes, i.e., single, double and other plaques, with 80% accuracy within the base test data set.

The Role of an Entity Classifier within a More General Histological Image Processing System The neural network entity classifier has been integrated into a more general image processing system (e.g., a system for histological image processing). The host system loads the neural network classifier when it is started.

After candidate entities have been isolated, an entity classifier will come into use. Given the image of an entity, the classifier first traverses the boundary of the entity counterclockwise. Next, it calculates Fourier descriptors of the boundary using a discrete Fourier transform algorithm. Then, it feeds the relative descriptor amplitudes to the neural network and displays which class the entity belongs to. If users disagree with the classifier, they indicate which class they think the entity should belong to. Then, the input from users is sent to the neural network as a target input, and the network will adjust the connection weights just a little through a single application of error back propagation.

Fourier descriptors capture only the shape information of entities. Other information, such as size, color, texture, color gradient, and so on, will have become available by the time the entities are defined. Therefore, before applying the neural network classifier, the host system excludes some entities based on criteria other than shape. For example, tiny entities are likely to be screened out. Similarly, entities of a faint color, even if they are not tiny, might also be rejected ahead of time.

As mentioned earlier, the majority of plaque entities to be classified are single plaques. Therefore, it is not very important for the classifier to discriminate one type of multiple plaque from another type of multiple plaque. The neural network classifier can distinguish single plaques from other classes of plaques, or vice versa, with 95% success. This level of accuracy is acceptable for our purposes.

System Extensions

The system may be modified to utilize Bayesian inference with Fourier descriptors to yield improved performance. The system may also utilize other genetic algorithms to produce neural networks. The system may also combine Fourier descriptors and some other entity measures to classify entities. Fourier descriptors give information only on the outline of a histological entity. However, the entities are not merely closed outline curves. For example, some entities have a nearly round outline, but also have a two or more dark colored cores.

Information on entity size or texture can be provided to the classifier. There is a correlation between entity size and an entity class. Thus, this information could be helpful in performing analysis of image data. For instance, multiple plaques are usually larger than single plaques. This correlation should be useful for plaque entity classification; thus, the system may therefore comprise an entity classifier which will accept size information as well as Fourier descriptors of an entity. Other types of information may also be provided. Prior probabilities might be used in conjunction with network outputs to estimate posterior probabilities.

Embodiment of Computer Execution Environment (Hardware)

Figure 10:
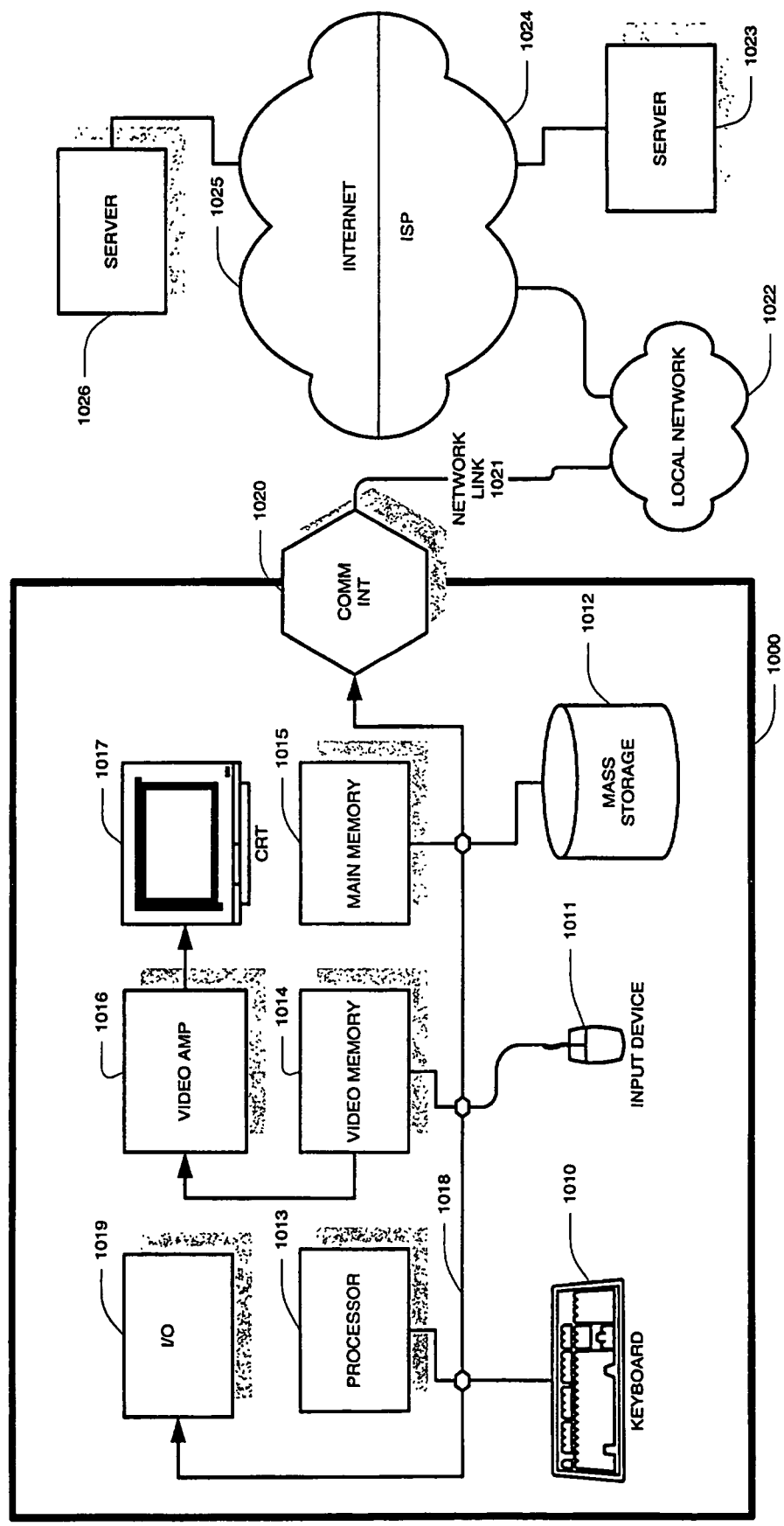
FIG. 10 illustrates a general hardware environment that may be utilized to implement an embodiment of the invention.

An embodiment of the invention can be implemented as computer software in the form of computer readable program code executed on one or more general-purpose computers such as the computer 1000 illustrated in FIG. 10. A keyboard 1010 and mouse 1011 are coupled to a bi-directional system bus 1018 (e.g., PCI, ISA or other similar architecture). The keyboard and mouse are for introducing user input to the computer system and communicating that user input to central processing unit (CPU) 1013. For instance, the keyboard and mouse, or any other input device may be utilized to collected information from the user about an image. Other suitable input devices may be used in addition to, or in place of, the mouse 1011 and keyboard 1010. I/O (input/output) unit 1019 coupled to bi-directional system bus 1018 represents possible output devices such as a printer or an AV (audio/video) device.

Computer 1000 includes video memory 1014, main memory 1015, mass storage 1012, and communication interface 1020. All these devices are coupled to a bi-directional system bus 1018 along with keyboard 1010, mouse 1011 and CPU 1013. The mass storage 1012 may include both fixed and removable media, such as magnetic, optical or magnetic optical storage systems or any other available mass storage technology. The system bus 1018 provides a means for addressing video memory 1014 or main memory 1015. The system bus 1018 also provides a mechanism for the CPU to transferring data between and among the components, such as main memory 1015, video memory 1014 and mass storage 1012.

In one embodiment of the invention, the CPU 1013 is a microprocessor manufactured by Motorola, such as the 6080X0 processor, an Intel Pentium III processor, or an UltraSparc processor from Sun Microsystems. However, any other suitable processor or computer may be utilized. Video memory 1014 is a dual ported video random access memory. One port of the video memory 1014 is coupled to video accelerator 1016. The video accelerator device 1016 is used to drive a CRT (cathode ray tube), and LCD (Liquid Crystal Display), or TFT (Thin-Film Transistor) monitor 1017. The video accelerator 1016 is well known in the art and may be implemented by any suitable apparatus. This circuitry converts pixel data stored in video memory 1014 to a signal suitable for use by monitor 1017. The monitor 1017 is a type of monitor suitable for displaying graphic images such as the images to be quantified.

The computer 1000 may also include a communication interface 1020 coupled to the system bus 1018. The communication interface 1020 provides a two-way data communication coupling via a network link 1021 to a network 1022. For example, if the communication interface 1020 is a modem, the communication interface 1020 provides a data communication connection to a corresponding type of telephone line, which comprises part of a network link 1021. If the communication interface 1020 is a Network Interface Card (NIC), communication interface 1020 provides a data communication connection via a network link 1021 to a compatible network. Physical network links can include Ethernet, wireless, fiber optic, and cable television type links. In any such implementation, communication interface 1020 sends and receives electrical, electromagnetic or optical signals which carry digital data streams representing various types of information.

The network link 1021 typically provides data communication through one or more networks to other data devices. For example, network link 1021 may provide a connection through local network 1022 to a host computer 1023 or to data equipment operated by an Internet Service Provider (ISP) 1024. ISP 1024 in turn provides data communication services through the world wide packet data communication network now commonly referred to as the "Internet" 1025. Local network 1022 and Internet 1025 both use electrical, electromagnetic or optical signals that carry digital data streams to files. The signals through the various networks and the signals on network link 1021 and through communication interface 1020, which carry the digital data to and from computer 1000, are exemplary forms of carrier waves for transporting the digital information.

The computer 1000 can send messages and receive data, including program code, through the network(s), network link 1021, and communication interface 1020. In the Internet example, server 1026 might transmit a requested code for an application program through Internet 1025, ISP 1024, local network 1022 and communication interface 1020. The user may therefore operate an interface to the image processing system from a remote location. Aspects of the invention may be embodied in server 1026 or a client computer connected to the network. Processing may occur on server 1026, computer 1000, or any other computer and the result can be delivered to the user via the network. The invention therefore contemplates the use of web-based system and/or client-server based systems embodying the invention. Alternatively, a single computer may function as a stand-alone device adapted to execute the image processing system described herein.

The computer systems described above are for purposes of example only. An embodiment of the invention may be implemented in any type of computer system or programming or processing environment. When a general-purpose computer system such as the one described executes the process and process flows described herein, it is configured to provide a mechanism for automating the expert quantification of image data.

Thus, a method and apparatus for generating special-purpose image analysis algorithms based on the expert quantification of image data is described. Particular embodiments described herein are illustrative only and should not limit the present invention thereby. The claims and their full scope of equivalents define the invention.

What is claimed is:

1. In a computer system, a method for automating the expert quantification of image data using a product algorithm comprising:
    obtaining a product algorithm for analysis of a first set of image data wherein said product algorithm is configured to recognize at least one entity within said first set of image data via a training mode that utilizes iterative input to an evolving algorithm obtained from at least one first user, wherein said training mode comprises:
    presenting a first set of said at least one entity to said user for feedback as to the accuracy of said first set of identified entities;
    obtaining said feedback from said user;
    executing said evolving algorithm using said feedback;
    presenting a second set of said at least one entity to said user for feedback as to the accuracy of said second set of identified entities;
    obtaining approval from said user about said second set of entities; storing said evolving algorithm as a product algorithm;
    providing said product algorithm to at least one second user so that said at least one second user can apply said product algorithm against a second set of image data having said at least one entity.

2. The method of claim 1 wherein said evolving algorithm comprises a neural network.

3. The method of claim 1 wherein said evolving algorithm comprises a classification engine.

4. The method of claim 1 wherein said product algorithm comprises a pixel zoo.

5. The method of claim 1 wherein said product algorithm comprises an entity zoo.

6. A computer program product comprising:
    a memory medium embodying computer readable program code for automating the expert quantification of image data, said computer readable program code configured to:
    obtain image data having a plurality of chromatic data points;
    identify which of said plurality of chromatic data points comprise an entity;
    group said plurality of chromatic data points into a plurality of spatially connected subsets;
    determine a plurality of characteristics about said spatially connected subsets;
    pass said plurality of characteristics to a classification engine;
    classify said plurality of spatially connected subsets into at least one classification;
    obtaining affirmation of the veracity of said at least one classification from a user;
    evaluate said spatially connected subset to derive a set of relative harmonic amplitudes;
    pass said relative harmonics into a neural network, wherein said neural network is trained to classify said spatially connected subsets using shape information provided by said set of relative harmonic amplitudes;
    present a result of said classification to said user;
    obtain verification of said classification from said user;
    using said verification to adjust said neural network.

* * * * *